(12) United States Patent
Kiyomoto et al.

(10) Patent No.: US 10,434,421 B2
(45) Date of Patent: Oct. 8, 2019

(54) GAME SYSTEM, AND STORAGE MEDIUM USED IN SAME

(71) Applicant: KONAMI DIGITAL ENTERTAINMENT CO., LTD., Tokyo (JP)

(72) Inventors: Masahiro Kiyomoto, Tokyo (JP); Koichi Tomita, Tokyo (JP); Toyokazu Sakai, Tokyo (JP); Shohei Sakuraba, Tokyo (JP); Erina Takeda, Tokyo (JP); Toru Miki, Tokyo (JP); Atsushi Usami, Tokyo (JP); Kanae Kokutani, Tokyo (JP); Naotaka Okamoto, Tokyo (JP)

(73) Assignee: KONAMI DIGITAL ENTERTAINMENT CO., LTD., Tokyo (JP)

( * ) Notice: Subject to any disclaimer, the term of this patent is extended or adjusted under 35 U.S.C. 154(b) by 37 days.

(21) Appl. No.: 15/841,057

(22) Filed: Dec. 13, 2017

(65) Prior Publication Data

US 2018/0099224 A1 Apr. 12, 2018

Related U.S. Application Data

(63) Continuation of application No. PCT/JP2016/066943, filed on Jun. 7, 2016.

(30) Foreign Application Priority Data

Jun. 18, 2015 (JP) .................................. 2015-123339

(51) Int. Cl.
*A63F 13/24* (2014.01)
*A63F 13/814* (2014.01)
(Continued)

(52) U.S. Cl.
CPC ............. *A63F 13/814* (2014.09); *A63F 13/20* (2014.09); *A63F 13/24* (2014.09); *A63F 13/25* (2014.09);
(Continued)

(58) Field of Classification Search
CPC ........ A63F 13/24; A63F 13/814; A63F 13/44; A63F 13/25
See application file for complete search history.

(56) References Cited

U.S. PATENT DOCUMENTS 6,342,665 B1 * 1/2002 Okita .................... A63F 13/005
84/609
6,450,888 B1 * 9/2002 Takase ................... A63F 13/10
434/250

(Continued)

FOREIGN PATENT DOCUMENTS

| JP | 2001-096061 A | 4/2001 |
| JP | 2003-144746 A | 5/2003 |
| KR | 10-2011-0000052 A | 1/2011 |

OTHER PUBLICATIONS

Uta Puri o Tanoshimu 10 no Hoho!!; Published: Jun. 7, 2016; 4 pages.

(Continued)

*Primary Examiner* — Omkar A Deodhar
*Assistant Examiner* — Shauna-Kay Hall
(74) *Attorney, Agent, or Firm* — Howard & Howard Attorneys PLLC

(57) ABSTRACT

Provided is a game system capable of expanding the range of factors that affect the result of the music game. The game system is provided with control panels having individual rotational buttons. The game system provides a music game in which operation timings at which the individual rotational buttons are to be operated are guided in accordance with the rhythm of a musical piece selected from among a musical (Continued)

piece group. Furthermore, the game system awards card selection opportunities for selecting character cards to be used in play, from among a plurality of character cards prepared so as to have a plurality of skills which are different to each other, and which respectively correspond to changes. In a special mode, the game system implements, in the music game, the changes corresponding to the skills of the character cards selected at the card selection opportunities.

15 Claims, 18 Drawing Sheets

(51) Int. Cl.
*A63F 13/46* (2014.01)
*A63F 13/44* (2014.01)
*A63F 13/20* (2014.01)
*A63F 13/25* (2014.01)

(52) U.S. Cl.
CPC ............. *A63F 13/44* (2014.09); *A63F 13/46* (2014.09); *G10H 2210/036* (2013.01); *G10H 2210/071* (2013.01); *G10H 2210/091* (2013.01)

(56) References Cited

U.S. PATENT DOCUMENTS

| | | | |
|---|---|---|---|
| 2001/0014620 A1* | 8/2001 | Nobe | A63F 13/10 463/7 |
| 2002/0002411 A1* | 1/2002 | Higurashi | A63F 13/005 700/91 |
| 2002/0160823 A1* | 10/2002 | Watabe | A63F 13/10 463/7 |
| 2007/0225061 A1* | 9/2007 | Naobayashi | G07F 17/32 463/20 |
| 2008/0248847 A1* | 10/2008 | Nakano | A63F 13/10 463/7 |
| 2012/0172121 A1* | 7/2012 | Migitera | G10H 1/363 463/31 |

OTHER PUBLICATIONS

International Search Report (International Application No. PCT/JP2016/066943); dated Aug. 16, 2016; Includes English Translation; 3 pages.

Written Opinion of the International Searching Authority (International Application No. PCT/JP2016/066943); dated Aug. 16, 2016; Includes English Translation; 7 pages.

Notification of Reasons for Refusal (JP Patent Application No. 2015-123339); Date of Drafting: Jun. 7, 2016; Includes English Translation and Original; 6 pages.

Decision to Grant a Patent (JP Patent Application No. 2015-123339); Date of Drafting: Sep. 26, 2016; Includes English Translation and Original; 6 pages.

Notification of Reason for Refusal (KR Patent Application No. 10-2017-7035891); dated Oct. 12, 2018; Includes English Translation; 10 pages.

Grant of Patent (KR Patent Application No. 10-2017-7035891); dated Apr. 26, 2019; Includes English Translation; 4 pages.

* cited by examiner

Fig. 10

| Genre | Tendency | | | | | | | | |
|---|---|---|---|---|---|---|---|---|---|
| | Type of operation | | | | | How displayed | | Other | |
| | Pushing in operation | Rotational operation | Repeated operation | Continuous operation | Combination operation | Lane | Lane bias | Tempo | Bonus |
| Rock | Many | Few | Many | Few | Moderate | Many straight line | Specified lane | Quick | None |
| Pop | Moderate | Moderate | Moderate | Many | Few | Balance | Balance | Moderate | None |
| Techno | Few | Many | Few | A little many | Many | Many curve line | Portion of lanes | A little quick | Exist |

Fig. 11

| Classification | Type | Subject | Effect |
|---|---|---|---|
| HP recovery | Skill 1 | Repeated operation | Recover a predetermined value of HPs when successful |
| | Skill 2 | Combination operation | HPs recover continuously over a predetermined period each time when successful |
| | Skill 3 | Rotational operation | Recover a predetermined value of HPs when successful |
| | Skill 4 | Pushing in operation | Recover a predetermined value of HPs each time when successful continuously over a predetermined period |
| High value score acquisition | Skill 5 | Repeated operation | Acquire predetermined bonus points when successful |
| | Skill 6 | Pushing in operation | Acquire predetermined bonus points each time when successful |
| | Skill 7 | Rotational operation | Acquire predetermined bonus points each time when successful continuously over a predetermined period |
| | Skill 8 | Combination operation | Rise points over a predetermined period each time when successful |
| Damage increase/ decrease | Skill 9 | Repeated operation | Rise damage value on miss, but points are doubled |
| | Skill 10 | Repeated operation | Reduce damage value on miss, but points are also down by half |
| Decision width change | Skill 11 | All | Reduce width of the judgment marker image |
| | Skill 12 | All | Enlarge width of the judgment marker image |

GAME SYSTEM, AND STORAGE MEDIUM USED IN SAME

CROSS-REFERENCE TO RELATED APPLICATION

The present application is a continuation of PCT Patent Application No. PCT/JP2016/066943, filed Jun. 7, 2016, which claims priority to Japanese Patent Application No. 2015-123339, filed Jun. 18, 2015, the disclosures of which are hereby incorporated by reference in their entirety.

TECHNICAL FIELD

The present invention relates to a game system or the like that is provided with a play input apparatus that is used for inputting play actions, and that provides a music game that guides the execution timing at which play actions are to be executed in accordance with the rhythm of a musical piece that is selected from among a musical piece group.

BACKGROUND ART

A game system is per se known that is provided with a play input apparatus that is used for inputting play actions, and that provides a music game in which the execution timings at which play actions are to be executed are guided in accordance with the rhythm of a musical piece that is selected from among a musical piece group. Moreover, with a game system of this type, in some cases, a simulated guitar may be employed as a guitar type input device, and the operation of a picking blade of this simulated guitar may be employed as a play action. For example, a game system is per se known (for example, refer to Patent Document #1) that guides appropriate operational timings by shifting a notes bar so that the notes bar that corresponds to an operational timing on the picking blade coincides with a reference line that corresponds to the present time instant, at the present time instant.

CITATION LIST

Patent Literature

Patent Document #1: Japanese Laid Open Patent Publication 2001-96061.

SUMMARY OF INVENTION

Technical Problem

With the game system of Patent Document #1, for example, a music game is provided that gives the feeling of performance of a musical piece by operations at appropriate operational timings. On the other hand, with this type of music game, if the musical pieces that are used for play are the same (i.e. if, when a plurality of degrees of difficulty are prepared for the same musical piece, the degree of difficulty is the same), then it is often the case that the contents of the music game become the same, even if any user plays that. Due to this, the possibility is high that the play results of users who possess the same level of experience (i.e. skill) are of the same level. As a result, there is a high possibility that the value of a musical piece may depend upon the level of experience of the user, which is undesirable. In a similar manner, there is a high possibility that the result of the music game will depend upon the choice of the musical piece or the level of experience, which is also undesirable. As a result, the elements that affect the values of musical pieces or the results of the music game are limited to the above, and accordingly there is a possibility that the user will become bored.

Accordingly, the object of the present invention is to provide a game system and the like, that is capable of expanding the range of factors that affect the result of the music game.

Solution to Technical Problem

The game system of the present invention is a game system comprising a play input apparatus that is used for input of play actions, providing a music game in which guidance is provided for execution timings at which the play actions should be executed, matched to the rhythm of a musical piece that has been selected from a musical piece group, and wherein the game system comprises: an opportunity awarding device configured to award a selection opportunity for selecting a character to be used during play from among a plurality of characters that are prepared so as to have a plurality of characteristics respectively corresponding to changes that are mutually different; and a characteristic awarding device configured to, when a start condition is satisfied, award a change in the music game corresponding to the characteristic of a character that has been selected in the selection opportunity.

On the other hand, a non-transitory computer readable storage medium of the present invention stores a computer program which is built so as to cause a computer comprising an input device as described above to function as the various devices of the game system described above.

BRIEF DESCRIPTION OF DRAWINGS

FIG. 10 is an explanatory figure for explanation of one example of some tendencies that correspond to genre;

FIG. 11 is an explanatory figure for explanation of the details of some skills;

DESCRIPTION OF EMBODIMENTS

Figure 1:
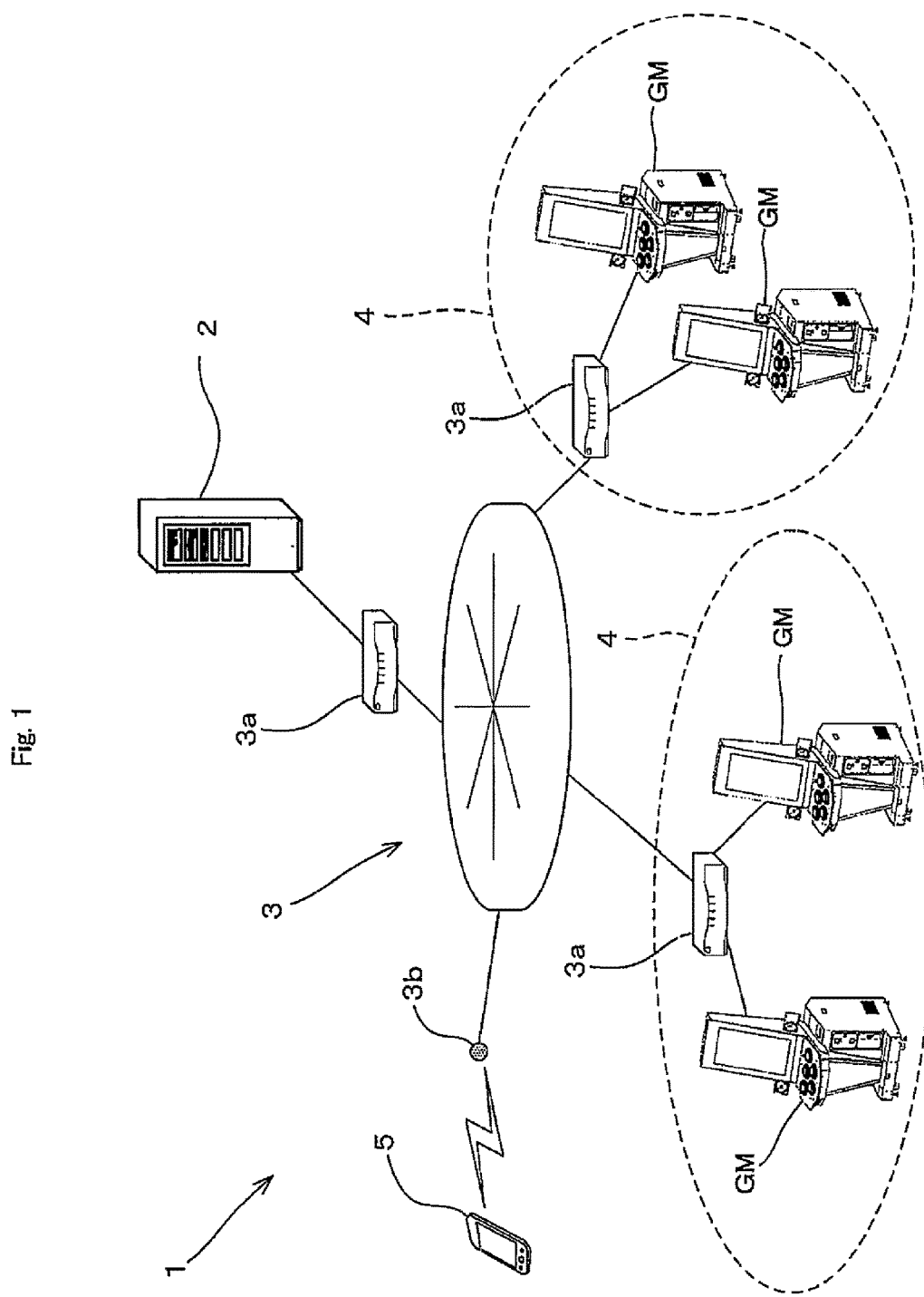
FIG. 1 is a figure showing a summary of the overall structure of a game system according to an embodiment of the present invention.

A game system according to an embodiment of the present invention will now be explained in the following. FIG. 1 is a figure showing a summary of the overall structure of a game system according to this embodiment of the present invention. As shown in FIG. 1, this game system 1 includes a central server 2 and a plurality of game machines GM. The game machines GM are connected to the central server 2 via a network 3. As one example, the game machines GM may be built as game machines for business use (i.e. for commercial use). Game machines for business use are game machines that allow games to be played over a predetermined range for payment of a fee, or at no cost. As one example, the game machines GM may provide a music game for a fee. In concrete terms, each of the game machines GM may, for example, in exchange for consumption of a predetermined consideration, provide a music game over a range that corresponds to that price. Game machines GM may be installed at an appropriate number of commercial facilities such as stores 4.

The central server 2 is not limited to an example in which it is provided as a single physical device. For example, it would be acceptable for a single logical central server 2 to be constituted by a server group that includes a plurality of physical devices. Moreover, it would also be acceptable for the central server 2 to be provided by employing cloud computing. Yet further, it would also be acceptable for one or more of the game machines GM to function as the central server 2.

Furthermore, a user terminal 5 is connected to the central server 2 via the network 3. This user terminal 5 is a type of network terminal device that implements functions of various types by executing software distributed from the central server 2. In the example of FIG. 1, a portable telephone (including a smart phone) serves as one example of a user terminal 5. Moreover, apart from the above, as the user terminal 5, it would also be possible to employ network terminals of various kinds that are capable of being connected to the network and that are mainly applied to personal use by their users, such as a personal computer, a portable game machine, or a portable tablet terminal device.

As one example, the network 3 may be configured to implement network communication by employing the TCP/IP protocol. Typically, the network 3 is built up as a combination of the internet, which serves as a WAN, and an intranet, which serves as a LAN. In the example of FIG. 1, the central server 2 and the game machines GM are connected to the network 3 via routers 3a, while the user terminal 5 is connected via an access point 3b.

It should be understood that the network 3 is not limited to that format in which it utilizes the TCP/IP protocol. For the network 3, it would also be acceptable to employ formats of various types that utilize cable circuitry for communication or wireless circuitry or the like (including communication by infrared or communication by short distance radio and so on). Or, for example, it would also be acceptable for communication between the user terminal 5 and the game machines GM and so on to be implemented, not by employing communication circuitry (including cable and wireless circuitry), but by utilizing codes (for example two dimensional codes) that are generated in conformity with some predetermined standard so as to include information of various types, such as two dimensional codes or the like. Accordingly, here the term "network" (or "communication circuit") is to be understood as including a method of transmitting and receiving information without employing any circuitry, such as the above type of communication method that employs a code or the like.

The central server provides game machine services of various types to the game machines GM or to their users. As services for the game machines, for example, it would be possible to receive identification information for users from the game machines GM, and to supply the service of authenticating those users. Moreover, it would also be possible to provide the service of storing play data for users who have been authenticated that has been received from the game machines GM, and the service of supplying such stored play data to the game machines GM. Yet further, it would also be possible for the service of distributing and updating programs and/or data for the game machines GM via the network 3, or a matching service of matching together users when a plurality of users want to play a game in common via the network 3 or the like to be included in the services for the game machines.

Furthermore, the central server 2 provides web services of various types to the user of the user terminal 5 via the network. For example, game information services that provide information of various types related to games supplied by the game machines GM may be included as such web services. Moreover, distribution services that distribute data or software of various types to user terminals 5 (including updating of data and so on) may also be included as such web services. Yet further, apart from the above, community services that supply meeting places for generation of information, exchange, and sharing by users, and services such as services that assign user IDs for identifying users or the like, may also be included as such web services.

Figure 2:
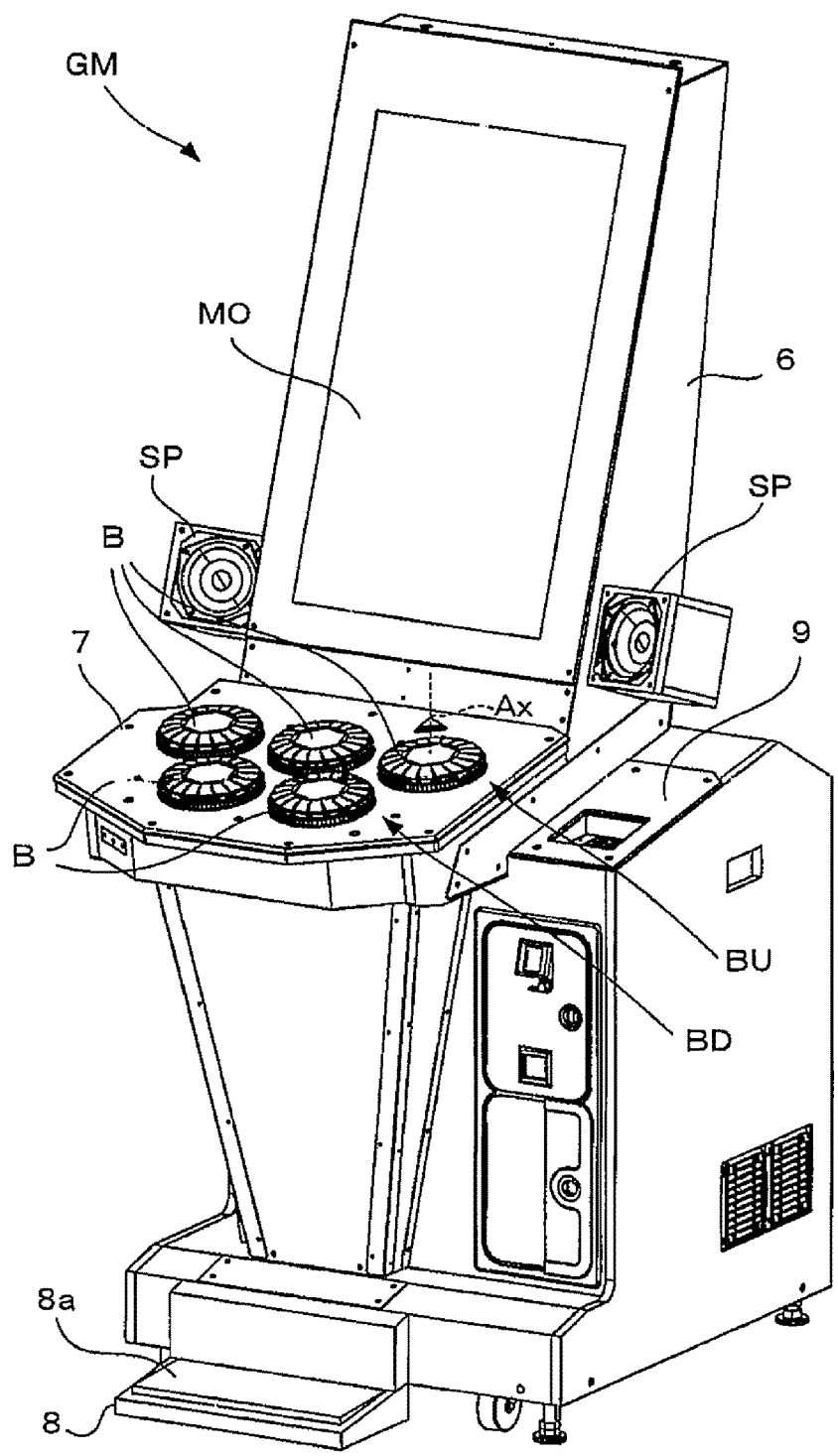
FIG. 2 is a figure showing an example of the external appearance of a game machine.

FIG. 2 is a figure showing the external appearance of one of the game machines GM. As shown in FIG. 2, this game machine GM has a casing 6. The casing 6 is built as a vertical type casing at which the user stands to play. A control panel 7 serving as a play input apparatus is provided at the central portion of the front surface of the casing 6, and a monitor MO serving as a portrait format display apparatus is provided above the control panel. The control panel 7 is disposed so as to slope somewhat downward toward the user from the horizontal.

A plurality of rotation buttons B serving as operation units for playing (five in the example shown in the figure) are provided to the control panel 7. Each of these rotation buttons B is formed in the shape of a circular cylinder. And each of the rotation buttons B is used for pushing in operation by being pushed inward and downward along the axial line Ax of its circular cylindrical shape. Moreover, each of the rotation buttons B is built to be rotatable both to the left and the right around its axial line Ax. And each of the rotation buttons B is also used for rotational operation by being rotated to the left and right around its axial line Ax. In other words, both pushing in operation and rotational operation may be inputted via the rotation buttons B.

As one example, as seen from the point of view of a user who is facing the monitor MO of the casing 6, the five rotation buttons B may be divided into two rows extending in the horizontal direction, these rows being arranged at the front and the rear (i.e. so as to be higher and lower). For example, as one example, the five rotation buttons B may include an upper side button group BU and a lower side button group BD. And this upper side button group BU and this lower side button group BD form two rows. In concrete terms, the upper side button group BU is disposed above the lower side button group BD. The upper side button group BU includes three of the rotation buttons B, and those rotation buttons B are arranged at regular intervals in a horizontal row above the lower side button group BD. On the other hand, the lower side button group BD includes two of the rotation buttons B, and those rotation buttons B are arranged at regular intervals in a horizontal row so as to be positioned below and between the rotation buttons B of the upper side button group BU. Accordingly, as seen from above the control panel 7, the five rotation buttons B form two rows, a row formed by the upper side button group BU and a row formed by the lower side button group BD. And, when seen from the point of view of the user, a difference in elevation is defined by these two rows along their slope in the vertical direction. To put it in another manner, the five rotation buttons B are arranged in a zigzag manner so that a letter W shape is defined by their centers.

Moreover, a foot pedal 8 serving as a changing input apparatus is provided at the front of the bottom portion of the casing 6. This foot pedal 8 is an input device that is built so as to be operated by the foot of the user. For example, the foot pedal 8 may be used by the user for stepping on operation input. In concrete terms, for example, the foot pedal 8 incorporates a pedal portion 8*a* that serves as a changing operation unit. The pedal portion 8*a* is an operation unit that is used for stepping on operation by the user. When the pedal portion 8*a* is operated by being stepped upon, the foot pedal 8 outputs a signal corresponding to this operation. Apart from the arrangements described above, the game machine GM is provided with a pair of left and right speaker units SP for reproducing sounds, and is also provided with devices of various types such as a console unit 9 for processing payments of game play fees (i.e. collection of payments) and for performing authentication of users and so on. It should be understood that, apart from the above, various input devices and output devices such as are provided to a typical game machine for business use may also be provided to the game machine GM, such as for example a power switch and a power supply lamp and so on, but these are not shown in FIG. 2.

Figure 3:
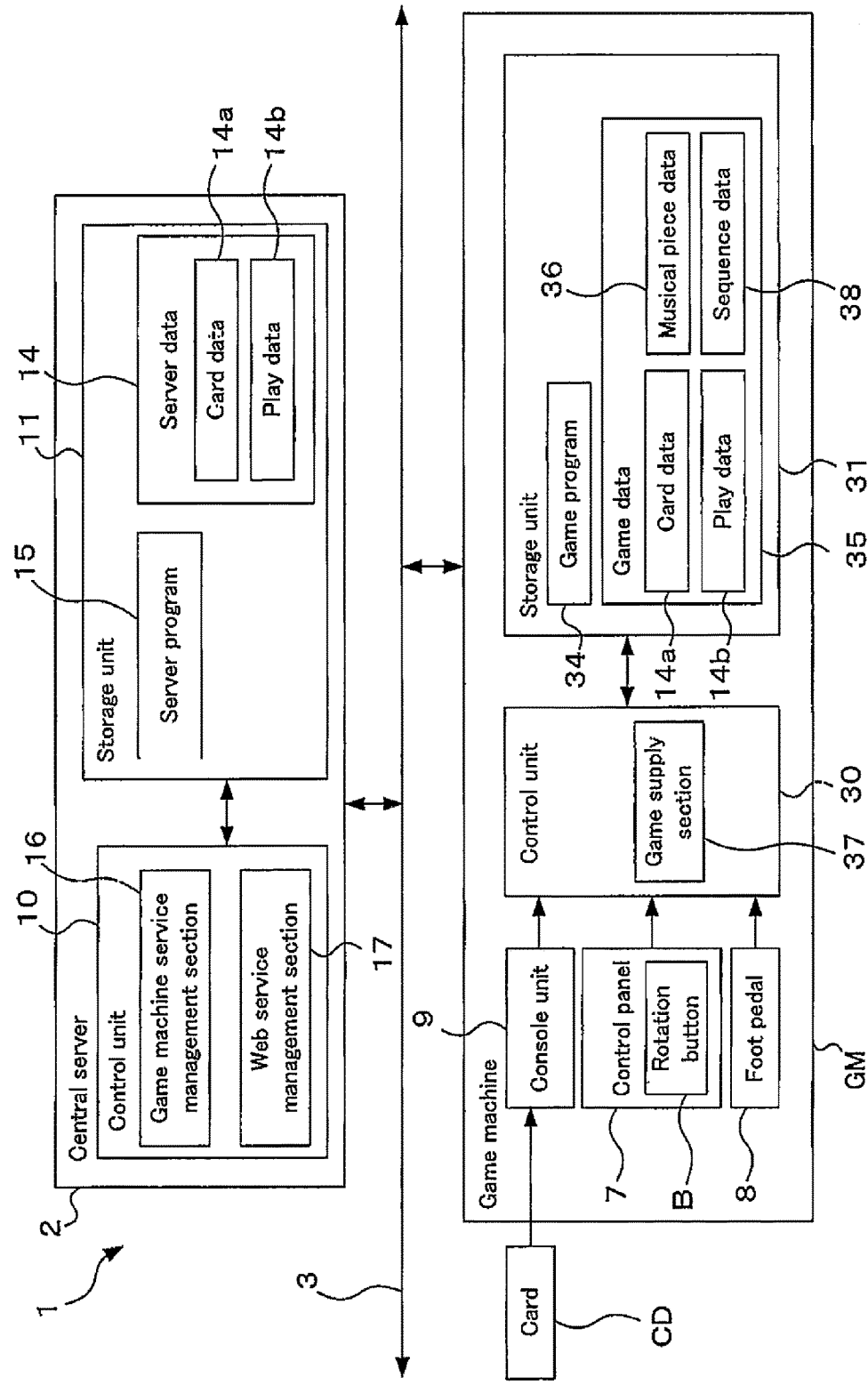
FIG. 3 is a figure showing the structure of principal portions of a control system of the game system.

Next, principal portions of a control system of this game system 1 for implementing a music game will be explained. FIG. 3 is a figure showing the structure of principal portions of the control system for the game system 1. As shown in FIG. 3, the central server 2 comprises a control unit 10 and a storage unit 11. The control unit 10 is built as a computer unit in which a microprocessor and peripheral devices of various types that are necessary for the operation of that microprocessor, such as internal storage devices (ROM and RAM, for example) and so on are combined. It should be understood that input devices such as a keyboard and so on, and output devices such as a monitor and so on, may be connected to the control unit 10. However, these are not shown in the figure.

The storage unit 11 is connected to the control unit 10. The storage unit 11 incorporates a high capacity storage medium such as, for example, a magnetic tape or the like, and is capable of maintaining storage even without any supply of power. Server data 14 and a server program 15 are stored in the storage unit 11. The server program 15 is a computer program that is required for the central server 2 to supply services of various types to the game machines GM and to the user terminal 5. A game machine service management section 16 and a web service management section 17 are implemented in the interior of the control unit 10 by the control unit 10 reading in and executing the server program 15.

The game machine service management section 16 performs processing for supplying the game machine services described above. On the other hand, the web service management section 17 performs processing that is required for supplying the web services described above. The game machine service management section 16 and the web service management section 17 are logical devices that are implemented as combinations of computer hardware and computer programs. It should be understood that, apart from the above, other logical devices of various types may be provided in the interior of the control unit 10. However, no such other devices are shown in the figure.

The server data 14 is data that is referred to while the server program 15 is being executed. For example, the server data 14 may include card data 14*a* and play data 14*b*. The card data 14*a* is data for defining characters, as will be described hereinafter. And the play data 14*b* is data in which information related to the past playing performance of various users is described. And the play data 14*b* may be used, for example, in order to inherit the play results for each user up to the previous play episode (i.e. his past performance) for use during the next and subsequent play episodes, or that is used in order to inherit settings details specific to each user. The details of the card data 14*a* and the play data 14*b* will be described hereinafter. It should be understood that, apart from the above, the server data 14 may, for example, also include ID management data. This ID management data is data for managing IDs of various types, such as user IDs and so on. Furthermore, the server data 14 may also include image data, musical piece data, sequence data, and so on, as will be described hereinafter.

On the other hand, a control unit 30 that serves as a computer, a storage unit 31, the console unit 9, the control panel 7, and the foot pedal 8 are provided to the game machine GM. The storage unit 31, the console unit 9, the control panel 7, and the foot pedal 8 are all connected to the control unit 30. The control unit 30 is built as a computer unit in which a microprocessor and peripheral devices of various types such as internal storage devices that are necessary for the operation of that microprocessor (for example ROM and RAM) are combined. It should be understood that, apart from the above, input devices and/or output devices of various types similar to those connected to other per se known game machines, such as for example the monitor MO described above and the speaker units SP and so on, may also be connected to the control unit 30. However, these are not shown in the figure.

The console unit 9 may, for example, be equipped with a card reader. The card reader may, for example, be a device of a per se known type that employs short distance wireless communication in order to read information of various types recorded upon a storage medium in a non-contact manner. As one example of a storage medium, the card reader may be used to read information upon a card CD. In concrete terms, as one example, the card reader may read in information upon cards CD held by the users, and may output signals corresponding to that information to the control unit 30. For example, a non-volatile storage medium (not shown in the figures) such as an IC chip or a magnetic stripe may be provided to each of the cards CD. Information of various types may be recorded upon the cards CD, via this type of non-volatile storage medium or the like. For example, information about a user ID or information that can specify a user ID may be included in these types of information. In other words, the cards CD may, for example, be used as ID cards, or may be used to specify the users who correspond to ID cards. In the explanation of this embodiment, it will be supposed that information about a user ID is included upon each of the cards CD. Moreover, apart from the above, the various types of information may include, for example, information about the amount of value used as predetermined consideration. And it will also be acceptable for a predetermined price to be collected by consuming part of this amount of value. In other words, as one example, the cards CD may be used for payments of a predetermined price. It should be understood that, apart from the above, the console unit 9 may also be provided with a coin collection device or the like that is used for collecting coins. And, for example, coins may be collected as the predetermined consideration via this coin collection device. Furthermore, apart from the above, the console unit 9 may be provided with input devices and output devices of various types, such as, for example, a ten key pad or the like that is used for inputting passwords and so on.

The control panel 7 outputs signals of various types to the control unit 30. For example, the control panel 7 outputs signals corresponding to the results of operation of the rotation buttons B to the control unit 30. In concrete terms, for example, for each of the rotation buttons B, signals corresponding to pushing in operation and rotational operation thereof are outputted to the control unit 30. In a similar manner for the foot pedal 8 as well, a signal corresponding to the operation of stepping upon the pedal portion 8a is outputted to the control unit 30.

On the other hand, the storage unit 31 is built so as to be capable of maintaining storage even without any supply of power, and may, for example, comprise a magnetic recording medium, an optical recording medium, a flash SSD (Solid State Drive), or the like. A game program 34 and game data 35 are stored in the storage unit 31. The game program 34 is a computer program that is required in order for the game machine GM to provide a music game. Due to the execution of this game program 34, a game supply section 37 is provided in the interior of the control unit 30. This game supply section 37 performs various types of processing necessary for the supply of the music game. The game supply section 37 is a logical device that is implemented by a combination of computer hardware and the above described computer program. It should be understood that, apart from the above, other logical devices of various types may be provided in the interior of the control unit 30. However, these are not shown in the figure.

The game data 35 is data that is referred during the execution of the game program 34. The game data 35 may include, for example, musical piece data 36, sequence data 38, and the card data 14a and the play data 14b described above. The card data 14a and the play data 14b are as described above. As one example, at least portions of the card data 14a and the play data 14b may be supplied from the central server 2, so that the necessary portions are included. The musical piece data 36 is data that is required in order to cause sounds of various types, such as a musical piece that is employed in the music game and so on, to be replayed from the speaker units SP. The sequence data 38 is data that is required in order to request the user to perform appropriate play actions during the music game. For example, the operational timings at which each of the rotation buttons B should be appropriately operated may be described in advance in the sequence data 38, and, in the music game, appropriate operation of each of the rotation buttons B and so on may be requested at those operational timings. The details of the sequence data 38 will be described hereinafter.

It should be understood that, apart from the above, the game data 35 may include, for example, image data or the like that is required for displaying a game screen or the like. Furthermore, the game data 35 may also, for example, include the ID management data described above. In other words, apart from the above, the game data 35 may also include data of various types required for provision of the music game and so on. However, no such data is shown in the figure.

Next, the game that is supplied by the game machine GM will be explained with reference to FIGS. 4 through 11. As one example, the game machine GM may supply a music game. A music game is a type of timing game. In concrete terms, a music game is a game of a type in which the timings of execution of appropriate play actions are evaluated. The execution timings at which appropriate play actions are to be executed may, for example, be supplied via the game screen along with a musical piece. Moreover, in a music game, timings that agree with the rhythm of the musical piece are employed as execution timings. In other words, a music game is a game of a type in which the user is requested to perform appropriate play actions at timings that correspond to the rhythm of the musical piece, and the timings at which these play actions are actually executed are evaluated.

Figure 4:
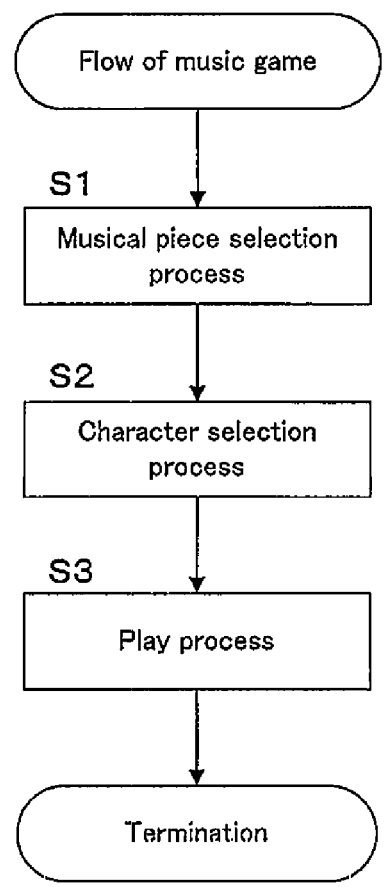
FIG. 4 is an explanatory figure for explanation of an example of the flow of a music game.

FIG. 4 is an explanatory figure for explanation of one example of the flow of the music game. In concrete terms, as part of the flow of the music game, the example in FIG. 4 also shows the overall flow until the music game is actually played. As shown in FIG. 4, the music game includes a musical piece selection process, a character selection process, and a play process that are performed in order. The musical piece selection process is a process (S1) for selecting a musical piece to be used in playing the music game. Moreover, the character selection process is a process (S2) for selecting one or more characters to be used in playing the music game. And the play process is a process (S3) in which the music game is actually played by the user. The results of the selections in the musical piece selection process and in the character selection process are reflected in the play process, in other words during the playing of the music game. It should be understood that it would also be acceptable for the musical piece selection process to be executed after the character selection process.

Figure 5:
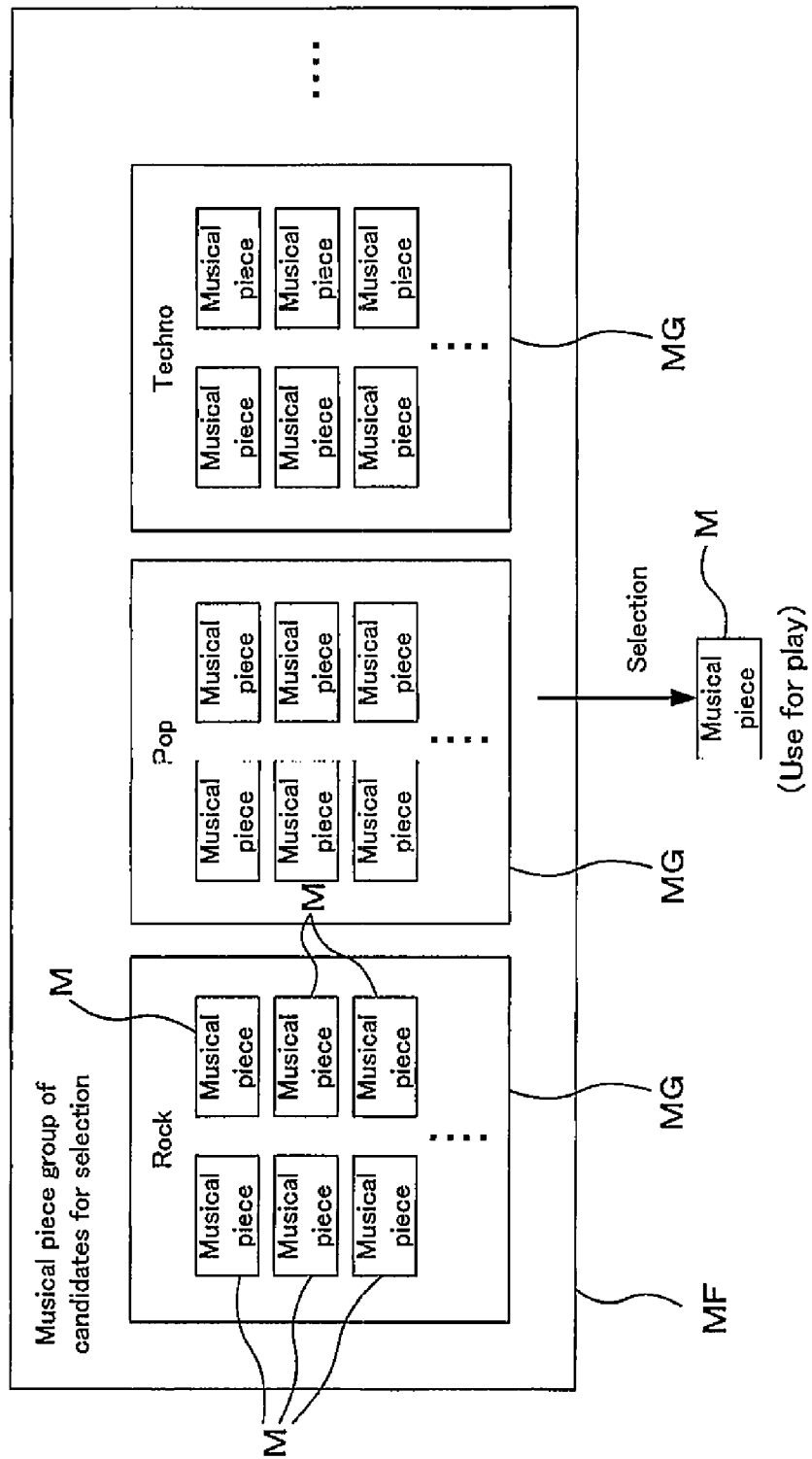
FIG. 5 is an explanatory figure for explanation of an example of the details of a musical piece selection process.

FIG. 5 is an explanatory figure for explanation of an example of the details of the musical piece selection process. As shown in FIG. 5, a large number of musical pieces M are prepared as a musical piece group MF of candidates for selection in the music game. Moreover, each of these musical pieces M has musical characteristics of various types. For this reason, each of the musical pieces M can be classified according to its musical characteristics. For example, the musical genre to which each of the musical pieces M belongs may be employed as a musical characteristic. In this case, for example, each of the musical pieces M may be classified under a genre, according to its musical characteristics. Here, for example, "Rock", "Pop", "Techno" and so on may be employed as musical genres. In other words, in this case, each of the musical pieces M is classified into a genre such as "Rock", "Pop", "Techno" and so on. As a result, the musical piece selection candidate group MF includes a plurality of sets MG that correspond to genres, such as a set MG of a plurality of musical pieces M that belong to the genre "Rock", a set MG of a plurality of musical pieces M that belong to the genre "Pop", a set MG of a plurality of musical pieces M that belong to the genre "Techno", and so on. And these sets MG differ from one another in musical characteristics. In other words, for at least a part of the musical pieces M, the musical piece selection candidate group MF includes a plurality of musical pieces M whose musical characteristics are mutually different. In the musical piece selection process, the musical piece M that is to be used for playing the music game is selected from such a musical piece selection candidate group MF.

It should be understood that the musical characteristics of each of the musical pieces M are not limited to being its genre. Apart from the above, these musical characteristics may include characteristics of various other types, such as, for example, degree of difficulty, source, artist, and so on. For example, the degree of difficulty is a characteristic that indicates the level of difficulty when used in the music game. This degree of difficulty may, for example, be determined by factors such as the tempo, the number of requests for operation, and so on. And the source may be determined, for example, according to factors such as "original" (dedicated to the music game), "remix" (a song edited for the music game from the original song), "created by user", and so on. Or a musical characteristic may be, not only a feature of the original musical piece, but a feature that is additionally added for the music game. For example, if the stage setting for the music game is classified under attributes such as "fire", "water", "light", "dark", or the like, then a similar attribute may be added to each of the musical pieces M. And this type of attribute may also be employed as a musical characteristic. Furthermore, it would also be acceptable for some of the musical pieces M not to belong to sets MG that correspond to their musical characteristics. In other words, some musical pieces M may exist whose musical characteristics are unique. In this case, for example, a tendency that corresponds to a musical characteristic that will be described hereinafter may be a tendency that is unique to a single musical piece.

Figure 6:
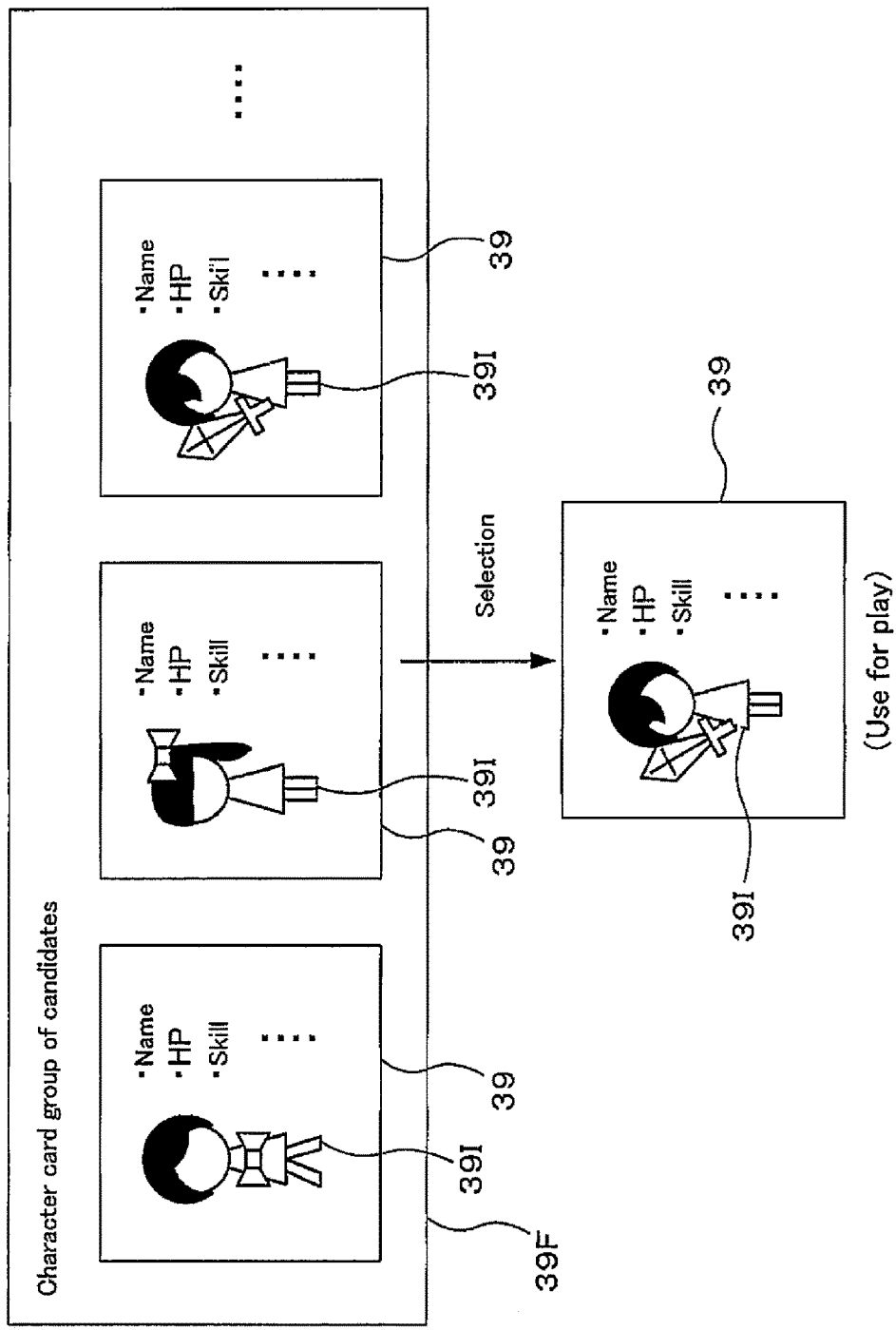
FIG. 6 is an explanatory figure for explanation of an example of the details of a character selection process.

FIG. 6 is an explanatory figure for explaining an example of the details of the character selection processing. As shown in FIG. 6, in the music game, a plurality of character cards 39 are prepared as a character card group 39F of candidates for selection. Each of these character cards 39 is a card that corresponds to a character for use in the music game. In other words, a plurality of characters corresponding to the plurality of character cards 39 are prepared for use in the music game. Moreover, as one example, each of the character cards 39 may be a card that exists electronically in the music game, in other words is a card that is defined electronically. It should be understood that it would also be acceptable for physical cards of various types, such as cards on paper or on a plastic medium or an electronic recording medium (including IC cards, for example) and so on to be used as the character cards 39. Moreover, for example, in these cases, it would also be acceptable for codes of various types, such as two dimensional codes and so on, to be used for recording information about the parameters of each of the characters and so on.

Each of the characters has parameters. For this reason, the parameters possessed by the character are set upon each of the character cards 39. The details of the parameters may, for example, be different according to the characters. In other words, as one example, each of the characters may be defined by its parameters, and may thereby acquire individuality. The parameters may, for example, include image information (not shown in the figures) for specifying a character image 391. These character images 391 are images depicting each character. Furthermore, the parameters may include items such as "Name", "HP", and "Skill". "Name" is information specifying the name of each character. And "HP" is information about the hit points (HP) possessed by each character. As one example, the hit points may be used as a value (a play value) for deciding whether or not play in the music game can continue. For each character, the amount of such value is individually set as "HP" information. Moreover, "Skill" is information about certain characteristics possessed by each character. As one example, "Skill" may be used for awarding changes of various types (i.e. beneficial effects) in the music game. The details of "Skill" characteristics will be described hereinafter. It should be understood that, for example, it would also be acceptable for the parameters also to include items specifying attributes such as "water", "fire", "light", "dark" and so on, in a similar manner to the case for the tendencies corresponding to musical characteristics. Furthermore, for example, it would also be possible for these attributes to be used for awarding changes according to the compatibility with the attributes of a musical piece M, if compatibility such as strength or weakness or the like is established mutually. Yet further, for example, if an attribute of a character is the same as an attribute possessed by the musical piece M, then it would be possible to award a change based upon the skill. For example, this type of change may include a change in which the beneficial effect of the skill improves, or in which it halves.

As one example, parameter information such as described above may be displayed upon each character card 39. In concrete terms, a character image 391 corresponding to the image information may be displayed upon each character card 39. Furthermore, information specifying "Name", "HP", and "Skill" may also be displayed. It should be understood that this information specifying "Name", "HP", and "Skill" may be displayed upon each of the character cards 39, or may not be displayed. If these items of information are not displayed, then means for checking this information (for example a dedicated screen or the like) may be provided separately.

As one example, according to the situation of play of the music game, each of the character cards 39 may be awarded to users as a benefit or the like. This type of award result may, for example, be reflected in the play data 14b. In other words, as one example, each of the character cards 39 may be owned by a user, and the character card or cards 39 that each user possesses may be managed with the play data 14b, using the user ID as a key. And, along with the use of each card CD, the play data 14b corresponding to each user is acquired by taking the user ID recorded upon each card CD as reference, and, on the basis of this play data 14b, each character card 39 possessed by each user (i.e. corresponding to each user ID) may be provided as an option in the character selection process. It should be understood that each of the character cards 39 is not limited to the format of being awarded according to the state of play in the music game. For example, each of the character cards 39 may be awarded in exchange for consumption of a predetermined price, or may be owned due to transfer or the like from some other user or the like. Furthermore, for example, these awards or transfers or the like may be provided via a website or the like, as one of the web services. And, if the ownership of each of the character cards 39 is managed by data such as the play data 38 or the like, then a change of owner along with transfer or the like may be implemented by changing the owner managed with that data (i.e. changes of the corresponding user ID).

On the other hand, for a user who does not possess any character card 39 (such as an initial user or the like), a predetermined character card 39 may be provided as an option in the character selection processing. And, in the character selection process, a character to be used in the music game is selected via the selection of such a character card 39.

It should be understood that, in the case of a user who does not possess any character card 39, the character selection process may be omitted. Moreover, the character selection process may also be omitted even in the case of a user who does possess a character card 39. Alternatively, it would also be acceptable for no character cards 39 to be selected in the character selection process. In these cases, character cards 39 (in other words, characters) are not employed in the music game. In other words, the use of a character card 39 (i.e., of a character) in the music game is not essential, and is optional. And, if the character selection process is omitted, then the music game may be played in a state in which no character card 39 (i.e. no character) is employed.

Figure 7:
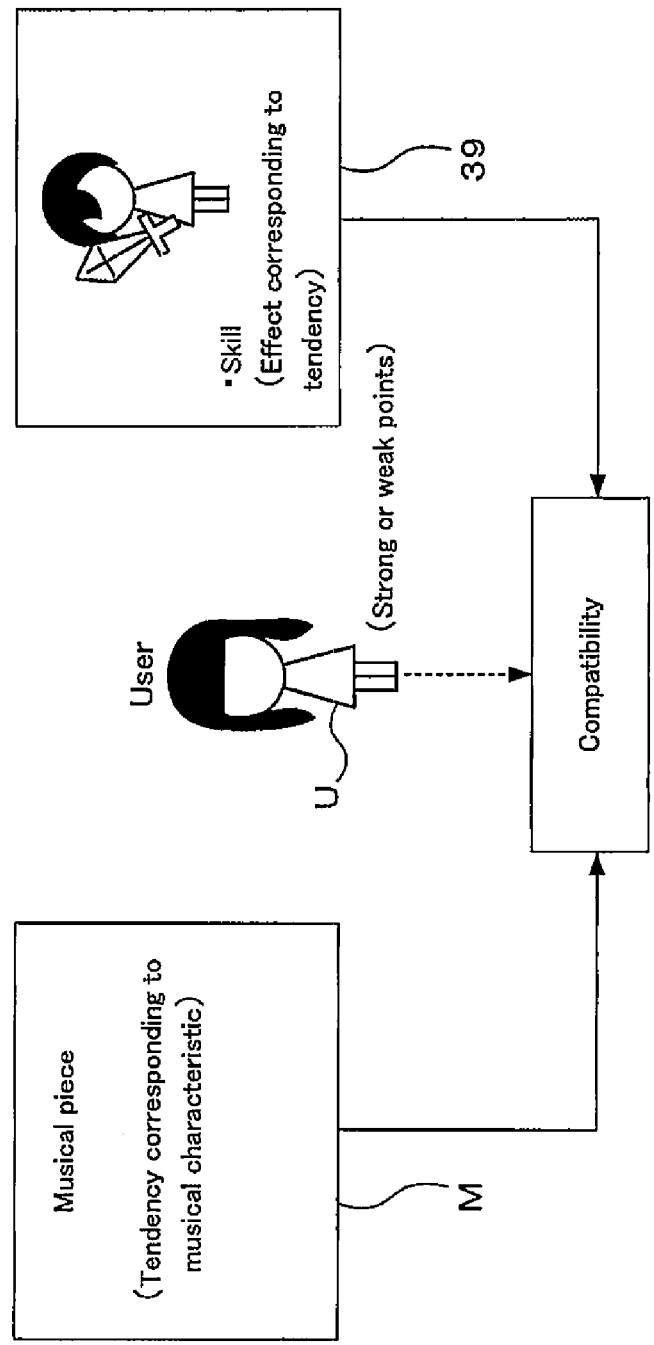
FIG. 7 is an explanatory figure for explanation of a relationship between musical characteristics of musical pieces and skills.

The selection of characters in the character selection process will now be further explained with reference to FIG. 7. FIG. 7 is an explanatory figure for explanation of the relationship between the musical characteristics of each musical piece M and skill. As shown in FIG. 7, as one example, in each musical piece M, a tendency corresponding to its musical characteristics is present. For example, all of the musical pieces M that belong to each genre such as "Rock", "Pop", "Techno" and so on have a common tendency. On the other hand, the skill of each character (i.e. of each character card 39) also has an effect that corresponds to a tendency corresponding to the musical characteristics of the musical pieces M. In other words, the skill of each character is associated with a tendency corresponding to musical characteristics. Due to this, the skill of each character may have compatibility corresponding to the musical characteristics possessed by each musical piece M.

Furthermore, naturally, each user U is skillful at doing some things and unskillful at doing other things. And sometimes the beneficial effects of skills, or tendencies corresponding to musical characteristics may be correlated with these his strong or weak points. Accordingly, in the character selection process, it is necessary for each of the users U to select, from among the available options, a character with which he considers his compatibility is good (i.e. that the possibility is high that he will obtain a good result), in consideration of the tendency of the musical piece M that he has selected during the musical piece selection process, and in consideration of his own strengths and weaknesses. As one example, each character may be selected in the character selection process in this manner. The details of compatibility between each musical piece M and skill will be described hereinafter, along with the details of tendencies that correspond to musical characteristics and skills. It should be understood that the number of character cards 39 (i.e. of characters) that are selected in the character selection process should be appropriate. In other words, in a music game, either a single character card 39 or an appropriate plural number thereof may be used for play. Moreover, one or more character cards 39 that are candidates for selection in advance may be set via one of the websites provided by a web service (hereinafter sometimes this card or cards is called a "deck"). And, in the character selection process, the deck that is actually to be used for play may be selected from among one or a plurality of decks (including the case in which one deck consists of a plurality of character cards 39). Alternatively, it would also be acceptable for the character selection process itself to be provided via a website, as one of the web services.

Next, the music game that is supplied in the play process will be explained with reference to FIGS. 8 and 9. As one example, the music game may include various modes. For example, the music game may include a normal mode and a special mode. In the play process, the music game is supplied in accordance with these modes.

In concrete terms, as one example, the normal mode and the special mode may be supplied via game screens. As one example, the game screens may be displayed upon the monitor MO as two dimensional images that produce virtual three dimensional spaces. These virtual three dimensional spaces, as one example, may be configured to include five lanes. And, as one example, these five lanes may extend parallel to one another in the virtual three dimensional space. Moreover, as one example, the five lanes may be arranged in a hierarchical manner in the virtual three dimensional space, so as to form two layers corresponding to the two rows of five rotation buttons B.

Furthermore, as one example, a judgment marker may be disposed in each lane of the virtual three dimensional space. In other words five judgment markers are disposed in the virtual three dimensional space, corresponding to the five lanes. Each of these judgment markers functions as a present time instant reference in the virtual three dimensional space. And each of the judgment markers moves along its lane according to the passage of time. Moreover, the virtual camera may be arranged so as to include one of these judgment markers at a fixed position in the photographic range, and may shift along with the judgment marker while maintaining this type of photographic range.

Yet further, as one example, objects of a plurality of types may be disposed at appropriate positions in each of the lanes. In concrete terms, objects of various types are disposed at appropriate positions, so that they appear in each lane at appropriate timings as each of the judgment markers moves. Moreover, as the judgment markers move, the objects come to coincide with the judgment markers. In other words, each of the judgment markers shifts along its lane according to the passage of time toward the distant portion of the lane, so as to arrive at each object at a timing at which appropriate operation is to be requested from the user. As a result, each of the lanes functions as a time axis.

As one example, the game screen is displayed so that, when this type of virtual three dimensional space is photographed with a virtual camera, it corresponds to the two dimensional image. In more concrete terms, the game screen is supplied as a two dimensional image that corresponds to what would be the result of photography if the virtual three dimensional space that includes these judgment markers and objects of various types were to be photographed with a virtual camera that shifts along with one of the judgment markers. Accordingly an image that corresponds to these lanes, judgment markers, and objects of various types is displayed upon the game screen. And the game screens include a normal game screen for provision of the normal mode and a special game screen for provision of the special mode.

Figure 8:
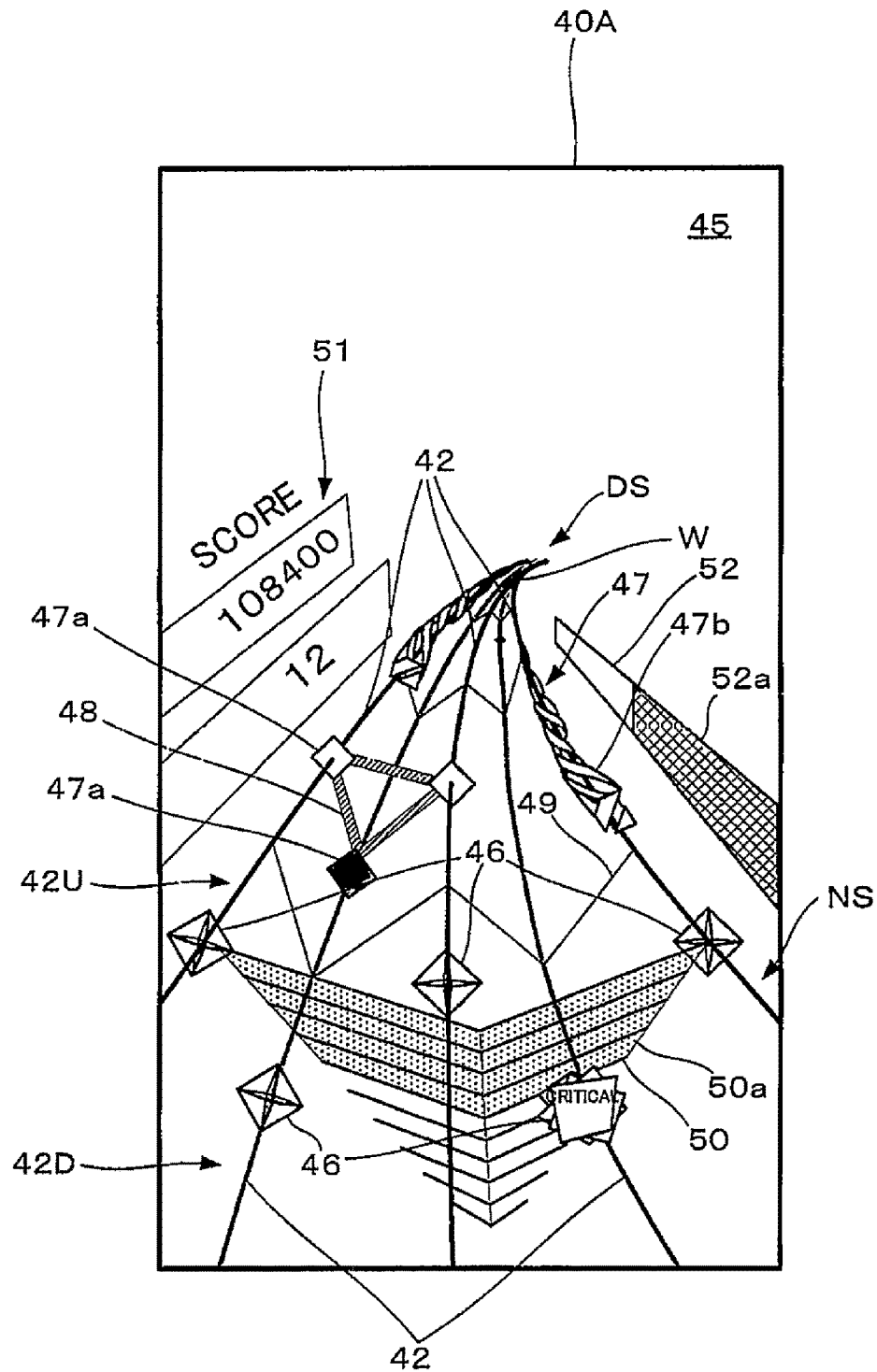
FIG. 8 is a figure schematically showing an example of a normal game screen that is employed in a normal mode.

FIG. 8 is a figure schematically showing an example of the normal game screen that is used in the normal mode. The normal mode is a mode of the music game that is provided in exchange for consumption of a predetermined consideration. As shown in FIG. 8, the normal game screen 40A includes a game region 45. As one example, lane images 42 are displayed in this game region 45. The five lane images 42 respectively correspond to the five lanes in the virtual three dimensional space. Moreover, the five lane images 42 include an upper lane image group 42U and a lower lane image group 42D, so as to correspond to the two layers that are formed by the upper lane group and the lower lane group in the virtual three dimensional space. The upper lane image group 42U corresponds to the upper lane group, and includes three lane images 42, so as to form the upper layer. Moreover, the lower lane image group 42D corresponds to the lower lane group, and includes two lane images 42, so as to form the lower layer. And two layers having a difference in elevation are defined by this upper lane image group 42U and this lower lane image group 42D, so as to correspond to the two rows of the five rotation buttons B. To put this in another manner, the five lane images 42 are arranged in a zigzag configuration, so as to define a letter W shape. And each of the lane images 42 of the upper lane image group 42U corresponds to one of the rotation buttons B of the upper side button group BU, while each of the lane images 42 of the lower lane image group 42D corresponds to one of the rotation buttons B of the lower side button group BD.

Furthermore, for each of the lane images 42, a judgment marker image serving as a reference mark is disposed in each of the lane images 42. Each of these judgment marker images 46 corresponds to a judgment marker in the virtual three dimensional space. Moreover, object images 47 serving as command marks are disposed in appropriate positions in each of the lane images 42. These object images 47 correspond to objects in the virtual three dimensional space. And the execution timings at which appropriate play actions are to be executed are guided by the occurrence of matchings between the object images 47 and the judgment marker images 46. In concrete terms, along with the shifting of the judgment markers, each of the judgment marker images 46 also shifts towards the distant side of its lane image 42 while passing through object images 47 sequentially at appropriate positions. In other words, as time elapses, each of the judgment marker images 46 shifts along each of the lane images 42, so as to coincide with the position of each object image 47 at the timing that the user is to be requested to perform the appropriate corresponding play action. The user is requested to perform the appropriate corresponding play actions when the positions of the judgment marker images 46 and the positions of the object images 47 coincide with one another.

The object images 47 include first operation object images 47a and second operation object images 47b that correspond to objects of a plurality of types. And the appropriate play actions that are requested to the user are different according to the types of the object images 47. For example, in the case of the first operation object images 47a, as appropriate play actions, pushing in operation to push in the rotation buttons B is requested. In concrete terms, a pushing in action is requested upon the rotation button B that corresponds to the lane image 42 on which each first operation object image 47a is disposed. Similarly, in the case of the second operation object images 47b, as appropriate play actions, rotational operation is requested upon the rotation buttons B that correspond to the lane images 42. And appropriate operation for the various types of object image 47 and its operational timings are evaluated. For example, when appropriate operation is executed, this evaluation is performed in relation to the time period of deviation between the actual operational timing at which this operation is performed and the requested timing (i.e. the timing at which the object image 47 and the judgment marker image 46 coincide with one another). And, the smaller this time interval difference is, the higher is the evaluation. On the other hand, if the time interval difference is greater than a predetermined interval, or if appropriate operation is not performed at all, then this is evaluated as being a mistake in operation.

Furthermore, for example, an assistance indicator may be displayed in the game region 45 when the execution timing or timings at which one or more appropriate play actions are to be executed satisfy an interval condition. As one example of an interval condition, such an interval condition may be satisfied by the execution timings that correspond to different rotation buttons B being included within a predetermined time interval. And an assistance indicator is employed in order to show that each of the object images 47 corresponds to these execution timings. For example, an assistance line 48 that connects between these object images 47 may be employed as an assistance indicator. In other words, as one example, in the game region 45, object images 47 in different lanes that correspond to execution timings that come within a predetermined time interval may be displayed by being connected to one another by an assistance line 48.

In a similar manner, an interval indicator 49 is displayed in the game region 45 for showing the elapsed time. For example, this interval indicator 49 may be displayed so as to show the elapsed time on each of the lane images 42, which all function as time axes. Moreover, for example, the actual elapsed time may be displayed at predetermined intervals. In a similar manner, for example, it would also be acceptable for the bars of the musical pieces that are used in the music game to be employed as the predetermined intervals. In other words, as one example, in the game region 45, the interval indicator 49 that subdivides the elapsed time of the musical piece into bars may be arranged so as to indicate the positions in the lane images 42 that correspond to each bar.

Furthermore, for example, a special mode gauge 50 may be displayed in the game area 45. This special mode gauge 50 is a gauge for measuring the amount of a mode change value 50a which serves as a judgment value. As one example, this mode change value 50a may be used in order to determine whether or not it is possible to provide the special mode. In concrete terms, for example, the right (i.e. the entitlement) to play the special mode may be awarded when the mode change value exceeds some predetermined amount (for example, when the maximum amount corresponds to the maximum possible value of the special mode gauge 50). This mode change value 50a, for example, may increase on the basis of the results of evaluations corresponding to the object images 47. In concrete terms, for example, while on the one hand the mode change value 50a increases to be greater the higher the evaluation result is, it does not increase in the case of mistaken operation. It should be understood that increase and decrease of the mode change value 50a may be implemented in various ways. For example, it will be acceptable to arrange to implement increase of the mode change value 50a uniformly, irrespective of increase or decrease of the result of evaluation. On the other hand, it would also be acceptable to arrange to reduce the mode change value 50a in the event of a mistake in operation. Moreover, it will be acceptable to arrange to increase the mode change value 50a along with the passage of time; and it will also be acceptable to arrange to increase and decrease it in correlation with the usage of items, or the like. Yet further, it would be acceptable to arrange for the mode change value 50a to be increased according to payment of a predetermined price.

In a similar manner, an HP gauge 52 is displayed in the game region 45. The HP gauge 52 is a gauge for measuring the remaining amount of HPs (hit points) 52*a*. The HPs 52*a* are, for example, used in order to decide whether or not to continue playing. In concrete terms, playing of the music game is continued while the remaining amount of HPs 52*a* is not zero. On the other hand, when the remaining amount of HPs 52*a* has become zero (i.e. when the HPs are completely consumed), then the music game is terminated even if the musical piece M is still being played. In other words, while play can be continued until the remaining amount of HPs 52*a* becomes zero, if the remaining amount of HPs 52*a* has become zero, then the play is terminated forcibly even if it is ongoing. And, as one example, the remaining amount of HPs 52*a* reduces by a predetermined value each time mistaken operation is performed. In other words, each time mistaken operation is performed, the time period for play is reduced. To put this in another manner, the music game can be played continuously provided that appropriate operation is performed. As one example, the HPs 52*a* may be used in this manner. It should be understood that it will also be acceptable for the remaining amount of HPs 52*a* to be increased by a predetermined amount each time that appropriate operation is performed. Moreover, this predetermined value may be higher, the higher is the evaluation result.

Furthermore, as one example, the initial remaining amount of HPs 52*a* reflects the "HP" details of the character that is selected in the character selection process. For example, if a single character is selected in the character selection process, then the "HP" value of this character may be set as the initial remaining amount of HPs 52*a* just as it is. Alternatively, if a plurality of characters have been selected in the character selection process, then the total of all the "HP" values of all these characters that have been selected may be set as the initial remaining amount of HPs 52*a*. The above is one example of how the "HP" value or values of the character or characters selected in the character selection process may be reflected in the initial remaining amount of HPs 52*a*.

In the FIG. 8 example, the normal game screen 40A corresponds to a two dimensional image that has been obtained by photographing each lane in the virtual three dimensional space, viewing obliquely from its upper side to its lower side. Furthermore, in this two dimensional image, each of the lanes is photographed so that each of the lane images 42 extends from the distant side DS in the depth direction (i.e. the opposite side to the judgment marker images 46) forward to the near side NS (i.e. the side of the judgment marker images 46), in other words, so that, along with the shifting of the judgment marker images 46, the object images 47 gradually approach from the distant side toward the near side (i.e. so that such an apparent effect is created). As a result, along with the perspective relationship, a parallax (in the vertical direction) is established between the upper lane image group 42U and the lower lane image group 42D. Yet further, each lane image 42 is shaped as curved, having a curved portion W that causes the direction of progression of the object images 47 to change. Parallax (in the horizontal direction) can be established even in this type of curved portion W, in a similar manner to the case of the vertical direction. Due to this, the assistance line 48 is disposed at positions in the three object images 47 that correspond to the same execution timing (i.e. at the positions of the three left side lane images 42 closer to the viewer). In other words, as one example of a predetermined time interval, the same execution timings are employed, and the three object images 41 in the different lane images 42 corresponding thereto are mutually connected to each other by the three assistance lines 48. Moreover, these object images 47 are arranged in the lane images 42 so as to be mutually shifted apart in the vertical direction or in the horizontal direction. Due to this, the three assistance lines 48 are arranged so as to define a triangle between the three object images 47.

Furthermore, in the example of FIG. 8, the special mode gauge 50 is formed in the shape of an inverted pyramid, so as to define a large arrow sign that indicates the front side. Moreover, the special mode gauge 50 has ten graduations, and the mode change value 50*a* (shown by the dotted pattern in the FIG. 8 example) is shown as having been accumulated up to four of those graduations. In a similar manner, the second operation object images 47*b* are made so as to extend along the lane images 42. In this case, as an appropriate play action, the user is instructed to start rotational operation to match the end of the second operation object image 47*b* with the judgment marker image 46, and to continue to perform this rotational operation continuously until the judgment marker image 46 passes the tail end.

In a similar manner, in the example of FIG. 8, the letters "CRITICAL" and an effect are added at the position of the judgment marker image 46 in the lane image 42 that is positioned second from the right. These are displayed when an appropriate play action is executed upon the object image 47 of this lane image 42. Moreover, in the case of the second operation object image 47*b*, these are displayed continuously while appropriate rotational operation is being continued. Furthermore, as the interval indicator 49, connection lines are employed that are arranged so as to connect the lane images 42 in the left-to-right direction in order. As a result, the interval indicator 49 is displayed so as to form a letter W.

Yet further, in the FIG. 8 example, a score display column 51 is provided on the left side of the game region 45 and further above the lane image 42. For example, the cumulative score from the start of the game (in this example, "108400") and the score that has currently been obtained (in this example, "12") are displayed in this score display column 51. Moreover, as one example, an HP gauge 52 in the form of a bar may be displayed at the upper right of the lane images 42. Furthermore, in this example, up to as much as half of the HPs 52*a* remain in this HP gauge 52 (in the example of FIG. 8, these are shown by the hatched pattern). In other words, here the HP gauge 52 shows a remaining amount of about half of the HPs 52*a*. As one example, the music game may be provided via this type of normal game screen 40A in the normal mode.

Next, the music game in the special mode will be explained. The special mode is a mode that is supplied when, in the normal mode, a special condition (i.e. a start condition) is satisfied. For example, the special condition may include a quantity condition and an operational condition as the requirements. As one example, the special condition may be satisfied if both this quantity condition (for starting) and this operational condition (for starting) are satisfied. As one example, the quantity condition may be the condition that an amount of the mode change value 50*a* is employed. In concrete terms, as one example, the quantity condition may be a condition for awarding the right to play the special mode. In other words, the quantity condition is satisfied when the amount of the mode change value 50*a* is greater than some predetermined amount. Furthermore, as one example, for the operational condition, the condition that operation upon the foot pedal 8 is performed may be employed. In concrete terms, as one example, the operational condition may be satisfied when the operation of stepping down upon the pedal portion 8*a* of the foot pedal 8 is executed. In other words, as one example, the special condition may be satisfied when, in a situation in which the right to play the special mode is awarded, the operation of stepping down upon the foot pedal 8 is executed. In more concrete terms, as one example, the special condition may be satisfied when the foot pedal 8 is operated after the mode change value 50*a* has exceeded some predetermined amount.

On the other hand, the special mode is terminated when a termination condition is satisfied. For example, the termination condition may include two conditions as requisites, a first termination condition and a second termination condition. And the termination condition may, for example, be satisfied when either one of these two conditions is satisfied. For example, in the first condition, the value of the mode change value 50*a* may be employed as a requisite. In concrete terms, as one example, in the special mode, it will be acceptable to arrange for the value of the mode change value 50*a* to decrease gradually along with the passage of time. And, as one example, the first condition may be satisfied when all of the mode change value 50*a* has been consumed. In this case, as one example, the special mode may be continued until all of the mode change value 50*a* has been consumed. However, it would also be acceptable to arrange for the first condition to be satisfied, not when the entire mode change value 50*a* has been consumed, but rather when the value of the mode change value 50*a* has become less than or equal to some predetermined amount.

On the other hand, in the second condition, a predetermined action that indicates the termination of the special mode may be employed as a requisite. For example, the operation of stepping upon the foot pedal 8 may be employed as this predetermined action. Accordingly, as one example, the second condition may be satisfied when stepping on operation upon the pedal portion 8*a* of the foot pedal 8 is performed while the special mode is being provided. In other words, during the special mode, it would be acceptable to arrange for the special mode to be terminated along with the operation of stepping upon the foot pedal 8. Furthermore, in this case, it would also be acceptable for the decrease of the value of the mode change values 50*a* to stop along with this termination. In other words, it would be acceptable for the special mode to be terminated on the basis of user action before all of the value of the mode change value 50*a* has been consumed. In this way, as one example, after the right to play the special mode has been awarded, the special mode may be started on the basis of user action, and may be ended on the basis of all of the mode change value 50*a* having been consumed, or, before that, on the basis of user operation. When termination on the basis of user action is permitted in this manner, the user is able to terminate the special mode at any timing that he desires before the first condition is satisfied, and a requirement arises for the user to decide from his own point of view whether or not termination of the special mode is beneficial and at what timing, so that, as a result, the level of strategic consideration needed for playing is increased, and it is possible to enhance the interest of the game. It should be noted that, if the value of the mode change value 50*a* becoming less than or equal to a predetermined amount is adopted as the first condition, then, if the remaining amount of the mode change value 50*a* is greater than the predetermined amount, the second condition becomes satisfied when user action has been performed.

In the special mode, as one example, a two dimensional image when the virtual three dimensional space is photographed under photographic conditions that are different from those in the case of the normal mode may be employed as a game screen. In concrete terms, in the special mode, as one example, the photographic conditions under which the virtual three dimensional space is photographed, such as the photographic position of the virtual camera (i.e. the position in which it is disposed), the angle of photography, the angle of view, and so on are changed, as compared to the photographic conditions in the normal mode. And game screens corresponding to two dimensional images that have been photographed under these photographic conditions that are different from those in the normal mode are employed in the special mode. Furthermore, in the special mode, the skill of each character that is being used during play yields beneficial effects. In other words, the skill of each character exerts an influence upon the playing of the game. In this manner, on the basis of the special condition and the termination condition, the mode is changed over between the normal mode (as one example, a mode in which skill exerts no influence) and the special mode (as one example, a mode in which skill yields a beneficial effect). In concrete terms, if the special condition is satisfied, then a changeover from the normal mode to the special mode is executed, and the special mode is provided. On the other hand when, in the special mode, the termination condition is satisfied, a changeover from the special mode to the normal mode is executed, and the normal mode is provided again. Furthermore, if a plurality of character cards 39 have been selected, then, as one example, the character card 39 that is the subject of activation may be changed over in a predetermined order each time the beneficial effect of a skill is manifested (i.e. is activated). In other words, as one example, each time the special mode terminates, a changeover is executed to the character card 39 whose skill is to be activated the next time. For example, if an order has been set in advance in the character selection process or the like, then this order may be adopted as the order for this changing over (i.e. as the predetermined order). Alternatively, it would also be acceptable to employ the order in which the character cards 39 were selected in the character selection process or the like as this order, just as it is without modification. Or opportunities to set this order may be awarded separately. And, as one example, this order may also be provided via a game screen or the like. For example, it would be acceptable for the character cards 39 to be displayed according to this order upon the game screen via which the character selection process is provided, in order from the left. Or it would also be acceptable for the normal game screen 40A to include a display of this type, or for another game screen that provides a display of this type to be prepared. On the other hand, a display of this type may be provided without any relationship to the order in which the skills are activated. Moreover, as one example, after the skill of the final character card 39 has been activated, this order may return to the beginning again. In other words, it would be acceptable for the character cards KC to be used in turn in a circular manner for activation of skills. Or, according to a user setting or the like, it would also be possible for a different order to be adopted each time the skill of the last character card 39 is activated.

Figure 9:
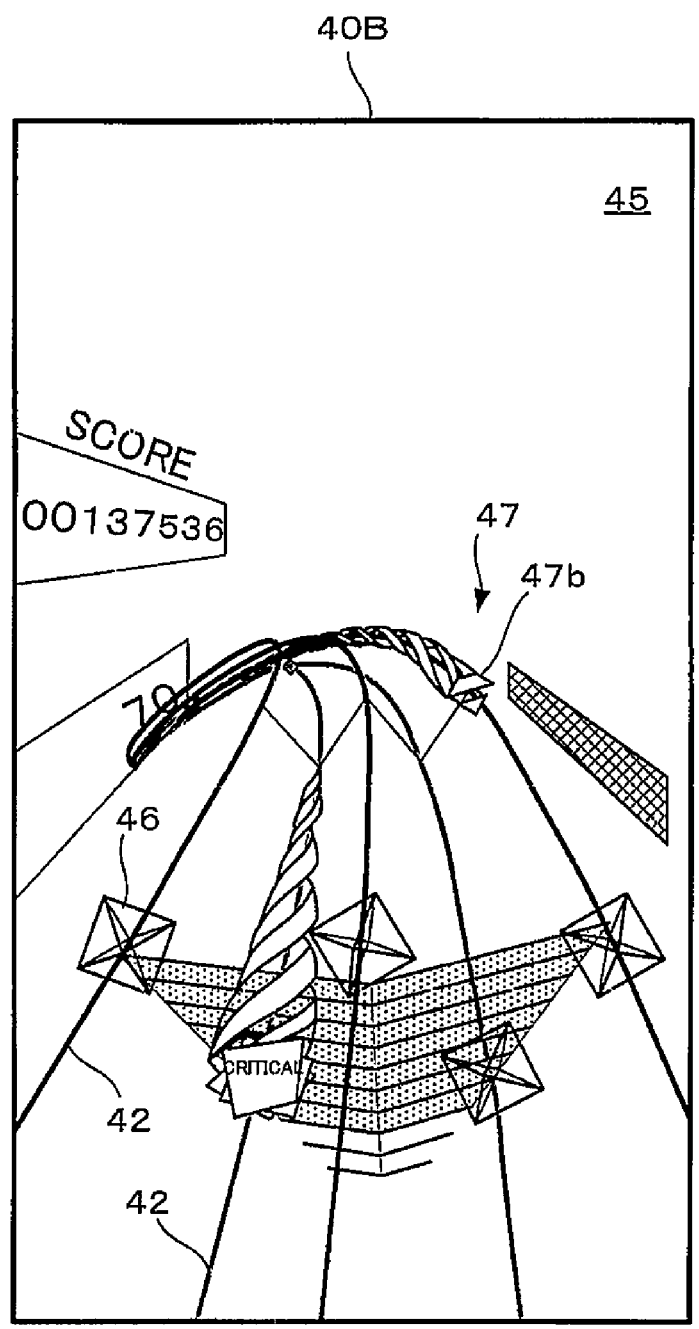
FIG. 9 is a figure schematically showing an example of a special game screen that is employed in a special mode.

FIG. 9 is a figure schematically showing an example of a special game screen that is employed in the special mode. In the FIG. 9 example, as compared with the example of FIG. 8 (the normal mode), a state is shown in which the photographic conditions that are employed in the special mode have been changed by the position of the virtual camera in the virtual three dimensional space being lowered downward, and by the photographic angle becoming somewhat more gentle so that the lanes and so on are included in the new photographic range. As shown in FIG. 9, in this case, along with the changes of the position of the virtual camera and of the photographic angle, the lane images 42 and so on are displayed upon the special game screen 40B so as to be closer to the viewer, as compared to the case with the normal game screen 40A.

In concrete terms, each of the judgment marker images 46 is displayed to be nearer to the viewer, and larger. In a similar manner, the object images 47 are also displayed to be larger in the vicinity of the judgment marker images 46. Moreover, since the length of each lane that is included in the photographic range becomes longer, each of the lane images 42 on the special game screen 40B becomes longer than on the normal game screen 40A, but, along with the photographic angle becoming more obtuse, the five lane images 42 are displayed so as to appear like one lane until the viewer side (near to the judgment marker images 46) closer than that of the example of FIG. 8. As a result, the position at which it is possible to distinguish which of the object images 47 is disposed in which of the five lane images 42 becomes shorter. On the other hand, there is no change in the operational timings at which appropriate actions are to be performed. In other words, the distance between the position at which it is possible clearly to recognize the position of each of the object images 47 and the position of each of the judgment marker images 46 becomes shorter. Due to this, the shifting speed of each of the judgment marker images 46 on the special game screen 40B is experienced as being faster (i.e. the sense of speed increases). And, since the degree of difficulty thereby becomes enhanced, accordingly in the special mode it would be appropriate for benefits to be awarded, such as increasing the amount of score corresponding to an evaluation result, increasing the speed at which the amount of the mode change value 50a rises, or the like. Or, it would also be acceptable to provide the special mode in order only to provide a change of operational feeling (without awarding any other benefits).

It should be understood that, in the special mode, photographic conditions that are different from those in the normal mode may be employed exclusively. Alternatively, it would also be possible to employ photographic conditions of various types that are different from those in the normal mode, according to specific conditions. In other words, in the special mode, it would be possible to employ photographic conditions that correspond to specific conditions. As an example of a specific condition, it would be possible to employ an operation that designates photographic conditions of various types. This type of operation may be implemented by a dedicated operation section, or could be implemented via combinations of the rotation buttons B and/or via combinations of those and the foot pedal 8. Moreover, as a specific condition, it would also be possible to employ the state of usage of items in the music game, the state of selection of options, the score situation, or the like.

Next, the details will be explained of the tendencies corresponding to musical characteristics, and of the skills and the compatibilities of the character cards 39. First, with reference to FIG. 10, the tendencies corresponding to genre will be explained, as one example of the tendencies corresponding to musical characteristics. FIG. 10 is an explanatory figure for explanation of part of the tendencies corresponding to genre, as an example. As shown in FIG. 10, as one example, the tendencies corresponding to genre include, as action tendencies, tendencies that correspond to "Type of operation", "How displayed", and "Other".

"Type of operation" is a tendency that corresponds to actions of various types that are performed upon the rotation buttons B. Since actions that are performed upon the rotation buttons B correspond to play actions themselves in the music game, accordingly the possibility is high that they have a direct correspondence with the result of the music game. For this reason, in many cases, the tendency of "Type of operation" is directly related to the result of the music game. In concrete terms, as described above, pushing in operations that correspond to the first operation object images 47a and rotational operations that correspond to the second operation object images 47b are executed upon each of the rotation buttons B. Furthermore, there are also cases in which repeated operation of performing those operations (one or both of pushing in operation and rotational operation) repeatedly or continuous operation of performing those operations continuously is executed. For example, such repeated operation may be operation in which those operations are to be executed repeatedly more than a predetermined number of times within a predetermined time interval. In this embodiment, this repeated operation means that the same operation, for example pushing in operation, is to be executed repeatedly more than a predetermined number of times within a predetermined time interval; but it would also be acceptable to arrange for it to mean that different operations, for example pushing in operation and rotational operation, are to be executed repeatedly more than a predetermined number of times within a predetermined time interval. Moreover, for example, continuous operation is operation in which the above operations are to be continued for a predetermined time interval. For example, an operation in which the state of each of the rotation buttons B being continuously kept pushed in is to be maintained for a predetermined time interval (i.e. long press operation) may be considered as continuous operation of the pushing in operation type. In a similar manner, an operation in which the operation of continuing to rotate each of the rotation buttons B is to be maintained for a predetermined time interval may be considered as continuous operation of the rotational operation type. Yet further, for example, a combination operation in which these operations are to be combined may also be executed. In such a combination operation, for example, both pushing in operation and rotational operation may be performed at the same time. In other words, as one example, this combination operation is operation to rotate each of the rotation buttons B in the state in which it is pushed in. Due to this, the tendencies under the rubric of "Type of operation" include tendencies corresponding to these pushing in operation and rotational operations.

Furthermore, "How displayed" is a tendency corresponding to the display of the special game screen 40B. For example, as described above, the lane images 42 may be displayed on the special game screen 40B. Due to this, "How displayed" may include, for example, a tendency that corresponds to the lane images 42. Furthermore, since the various types of operation described above are guided via the lane images 42, accordingly there is a possibility that a tendency corresponding to the lane images 42 is indirectly correlated with the result of the music game. For this reason, in many cases, the tendency "How displayed" is indirectly related to the result of the music game. In concrete terms, various different modes may be adopted as the display mode for the lane images 42, such as straight line shapes, curvilinear shapes, cranked shapes, wave-like shapes that undulate up and down, or the like. For this reason, "How displayed", for example, includes a tendency corresponding with "Lane", that shows the display mode for this kind of lane image 42. Moreover, while an object image 47 is displayed on each of the lane images 42, some case may occur in such an arrangement of the object images 47, such as a case in which there is a bias toward a specific lane image, a case in which it is not a bias to a specified lane image 42 but rather is a bias to a portion of lane images 42, a case in which the balance is good (the bias is relatively small), or the like. Due to this, as one example, "How displayed" includes a tendency to "Lane bias" that indicates this type of biasing of the arrangement of the object images 47.

In a similar manner, "Other" includes various types of tendency corresponding to the playing of the music game. In concrete terms, as one example, the tendency of "Other" includes various factors for which there is a possibility that they are indirectly correlated with the result of the music game. For this reason, as one example, "Other" also, in many cases, is indirectly correlated with the result of the music game. In concrete terms, for example, tendencies "Tempo" and "Bonus" are included in "Other". For example, "Tempo" is a tendency that indicates the speed of the tempo of the musical piece M, i.e. of its rhythm. For example, if "Tempo" is quick, then there is a tendency for the apparent speed to rise. Furthermore, the number of displays of object images 47 may also increase. For this reason, it is often the case that "Tempo" is related to the degree of difficulty of the musical piece M. Thus "Other", for example, includes this type of tendency "Tempo". Moreover, "Bonus" is a tendency that is correlated with bonus events of various types (scores or the like being specially awarded). For example, it would be acceptable for the music game to include special object images 47 for which special scores or the like are awarded. Apart from the above, the music game may also include bonus events of various types. As one example, "Bonus" is a tendency that indicates the presence or absence of bonus events of this type.

In the example of FIG. 10, for example, as tendencies for "Pushing in operation" that is included under the rubric of "Type of operation", separately by genre, under the rubric of "Rock" there is a tendency for "Many", in "Pop" there is a tendency for "Moderate", and in "Techno" there is a tendency for "Few". In this case, for a musical piece M that belongs to the genre "Pop", it is often the case that the number of requests for "Pushing in operation" in other words the number of displays of the first operation object images 47*a*, is moderate (i.e. is neither many nor few). On the other hand, it is often the case that there are more (or at least more than a "Moderate" number) of this type of request for a musical piece M that belongs to the genre "Rock", while there are fewer for a musical piece M that belongs to the genre "Techno". The same holds for other tendencies. As one example, this type of tendency according to genre exists, and therefore by extension exists according to musical characteristics. It should be understood that, in the example of FIG. 10, as one example, tendencies (for example, directly or indirectly urging the user to perform a specific play action) are shown that are widely associated with operations (i.e. play actions) upon the rotation buttons B (and that are tendencies that, by extension, influence the result of the music game). However, the tendencies that correspond to musical characteristics are not limited to the example of FIG. 10. For example, tendencies of various types that are widely correlated with music games may be adopted as musical characteristics. Moreover, a part of the example of FIG. 10 (for example, a part of the tendencies "Pushing in operation" or "rotational operation" under the rubric of "Type of operation" or the like) may also be employed as tendencies that correspond to musical characteristics.

On the other hand, FIG. 11 is an explanatory figure for explanation of a portion of the details of skill. As shown in FIG. 11, as one example, the skills of the character cards 39 are classified under a plurality of headings. For example, this plurality of headings includes the classifications of "HP recovery", "High value score acquisition", "Damage increase/decrease", and "Decision width change". For example, "High value score acquisition" and "Decision width change" are classifications that exert influence upon the evaluation of the music game (for example, upon the results of evaluation of actions of various types). On the other hand, "HP recovery" and "Damage increase/decrease" are classifications that exert influence upon change of the amount of HPs 52*a*. In concrete terms, for example, "HP recovery" is a skill classification that corresponds to the remaining amount of HPs 52*a*. Furthermore, for example, "High value score acquisition" is a skill classification that corresponds to the points (score) acquired, according to the state of play. In a similar manner, for example, "Damage increase/decrease" is a classification corresponding to increase or decrease of the remaining amount of HPs 52*a* due to mistaken operation, while "Decision width change" is a classification corresponding to the width of the judgment marker image 46 (i.e. its width in the depth direction, in other words its width along the lane image 42 in the time axis direction).

Furthermore, the skills are correlated with the type of operation upon each of the rotation buttons B. For example, as described above, for each of the rotation buttons B, it is possible to perform pushing in operation, rotational operation, repeated operation, continuous operation, and combination operation. Due to this, as one example, the skill of each character card 39 also corresponds to these various types of operation. In more concrete terms, as one example, these operations of various types are set as subjects the beneficial effects of whose skills should be manifested. In other words, as one example, the beneficial effect of the skill of each character card 39 is added to the music game when the various subject types of operation are executed.

In the example of FIG. 11, for example, "Skill 1" belongs to the classification "HP recovery". Moreover, as an influence upon the music game, this "Skill 1" has the "Effect" of "Recover a predetermined value of HPs when successful". And, among the various types of operation, "Skill 1" is associated with "repeated operation". Accordingly, in this case, "Skill 1" is a skill that has the beneficial effect of restoring the remaining amount of HPs 52*a* to a predetermined value when repeated operation is successful (for example, when it is not the mistake in operation). In a similar manner, for example, "Skill 2" functions as a skill by which the HPs recover continuously over a predetermined period each time that combination operation succeeds, and "Skill 7" functions as a skill by which a bonus score of a predetermined value is awarded (for example, a bonus score is added to the normal score) each time rotational operation succeeds for a predetermined number of successive times (for example twice).

As described above, as one example, the skill of each character card 39 is associated with operation of each of the rotation buttons B. On the other hand, tendencies corresponding to musical characteristics such as, for example, genre and so on are present in each musical piece M. And, as one example, such tendencies include tendencies that are directly related to the result of the music game and tendencies that are indirectly related thereto. For example, tendencies for "Type of operation" are included as directly related tendencies, and "Type of operation" is a tendency that is directly related to operations of various types, such as pushing in operation and so on. As a result, it is possible for compatibility to be present between each musical piece M and each character card 39.

In concrete terms, for example, if a character having "Skill 1" is used, then, since the beneficial effect of "Skill 1" is reaped each time repeated operation succeeds in the special mode, accordingly the possibility is high that the compatibility is good with a musical piece M which includes a lot of repeated operation (for example a musical piece of the genre "Rock"). At least, some positive merit exists. On the other hand, depending upon the user, in some cases he may be poor (i.e. unskillful) at repeated operation itself. In this case there is a possibility that the convenience may be good, even if the score that can be acquired upon success is reduced by half, from the point of view of the influence when repeated operation is taken as mistaken operation, in other words from the point of view of the beneficial effect of reducing the amount of damage to the HPs 52a (i.e. the amount of decrease thereof). In this case, the merit of passive compatibility exists. And it may also be preferable to have a passive beneficial effect upon repeated operation of "Skill 10" rather than a positive beneficial effect upon repeated operation of "Skill 1".

In a similar manner, when the width of a judgment marker image 46 is small, only a timing that is closer to the operational timing of the command is guided as being an appropriate timing. As a result, it is possible for the actual operation to be executed at a timing that is closer to the operational timing of the command. Due to this, for example, for a user who is skillful (good) at pushing in operation, "Skill 11" is compatible with a musical piece M for which there is a lot of pushing in operations. On the other hand, depending upon the user, in some cases "Skill 11" for which fewer successful results are evaluated highly may be preferable for a musical piece M which involves many pushing in operations. In other words, in some cases, "Skill 11" may be preferable even though the user is not good (i.e. is unskillful) at performing pushing in operation. Furthermore, for example, since enlargement of the width of the judgment marker image 46 corresponds (at least visually) to enlargement of the evaluation range, accordingly it is often the case that repeated operation becomes simple and easy. Due to this, it is often the case that many genres that involve a lot of repeated operations have good compatibility with "Skill 12". As one example, the beneficial effects that correspond to this type of positive or passive compatibility are reflected in the special mode. And each user U selects characters in the character selection processing while taking this type of compatibility into consideration. It should be understood that the skills are not limited to the example shown in FIG. 11. For example, a skill may also be adopted that has the beneficial effect that the operational timings of a part of the sequence data 38 to be described hereinafter are removed from the subjects for evaluation and are eliminated from the subjects for display and so on. Moreover, a part of the example of FIG. 11 may be employed as skills. In this manner, various types of way for awarding changes of various types may be employed in the music game as skills of various characters.

Figure 12:
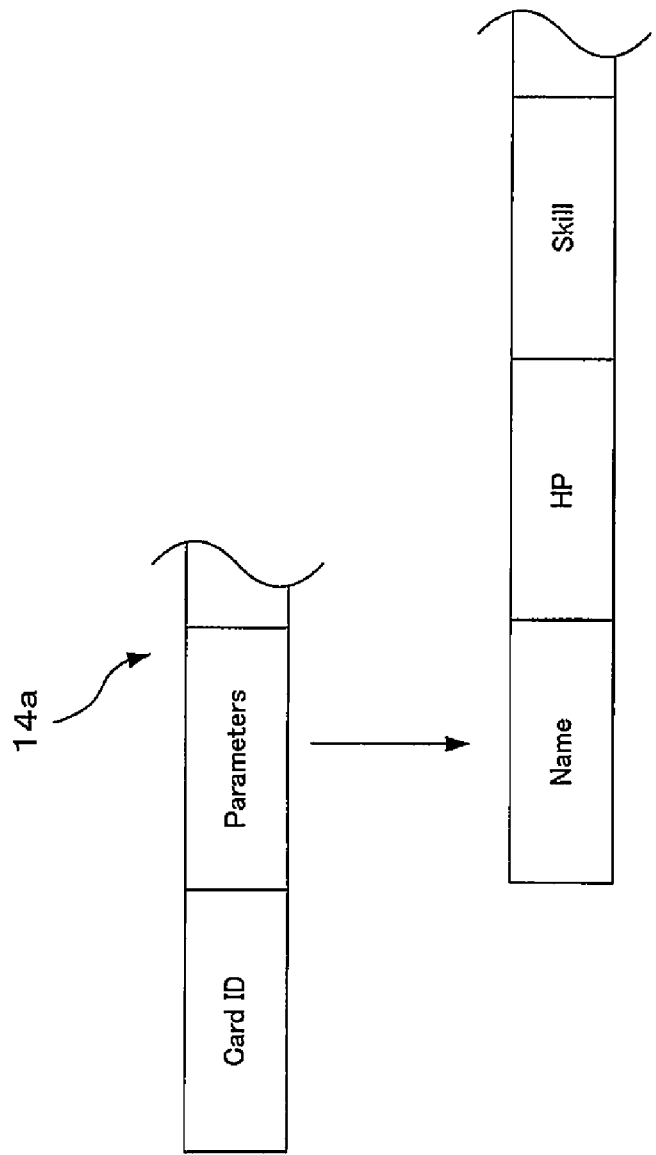
FIG. 12 is a figure showing an example of contents of card data.

Next, the details of the card data 14a, of the play data 14b, and of the sequence data 38 will be explained. The card data 14a is data for defining the character cards 39 described above. FIG. 12 is a figure showing an example of the details of the card data 14a. As shown in FIG. 12, the card data 14a may, for example, include the information "Card ID" and "Parameters". And, as one example, the card data 14a may consist of a set of records that are specified so that these items of information are held in mutual correspondence.

The "Card ID" is information specifying a unique ID (hereinafter this is sometimes termed the "Card ID") for each character card 39 (i.e. for each character). The card ID is used, for example, for identification and specification of each of the character cards 39. "Parameters" is information about parameters that are set for each of the character cards 39. As described above, the parameters of each of the character cards 39 include items such as "Name", "HP", "Skill", and so on. Due to this, "Parameters" also includes the information "Name", "HP", "Skill" corresponding to the above. For example, information specifying the "Name" of each character may be used as "Name", information specifying the amount of "HPs" that are set individually for each character may be used as "HP", and information such as "Skill 1" and so on for identifying the skill of each character may be used as "Skill". As one example, the card data 14a may be configured in this manner.

Figure 13:
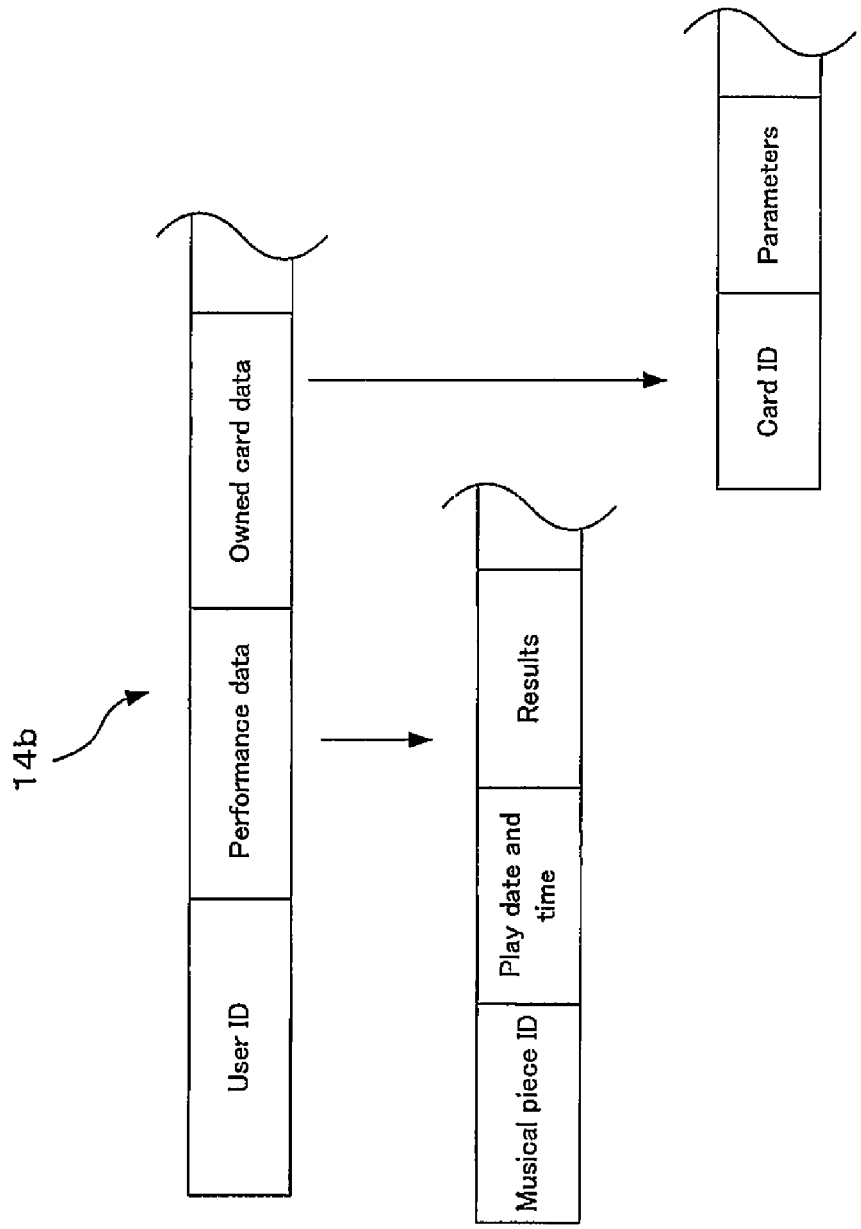
FIG. 13 is a figure showing an example of contents of play data.

The play data 14b is data for implementing continuity with past performance or the like. FIG. 13 is a figure showing an example of the contents of the play data 14b. As shown in FIG. 13, for example, the play data 14b may include the information items "User ID", "Performance data", and "Owned card data". And, as one example, the play data 14b may be configured as a set of records in which these items of information are associated with one another.

The "User ID" is information specifying the user ID described above (i.e. an ID for identifying each user). The "Performance data" is information for allowing the user's past performance to be inherited in the next and subsequent episodes of play. For example, "Performance data" may include "Musical piece ID", "Play date and time", and "Results". The "Musical piece ID" is information about the ID for identifying each musical piece M (hereinafter this is sometimes termed the "Musical piece ID"). The "Performance data" may, for example, include information about musical piece IDs that specify musical pieces M that were used in play in the past. And the "Play date and time" corresponds to information about the date and time that these musical pieces M were played, while "Results" corresponds to information about the results at that time.

Furthermore, "Owned card data" is information for specifying the character card 39 owned by each user. For example, the "Owned card data" may contain the information items "Card ID" and "Parameters". These items of information may, for example, correspond to the items "Card ID" and "Parameters" of the card data 14a. For example, it would be acceptable for the music game to be structured so as to change the details of the parameters of each character card 39 (i.e. of each character) according to the state of play. In other words, it would be acceptable for the music game to include a game factor of a training game in which the characters are trained up. In this case, even though two characters are the same, the details of their parameters may come to be different according to the state of play by the users (for example, the initial parameters defined by their card data 14a). For example, the details of this type of individual parameter may be included as information in "Parameters" under "Owned card data". As one example, the play data 14b may be structured in this manner. It should be understood that, for example, if the parameters of each character card 39 do not change (i.e. are fixed), then it will be acceptable for the information "Parameters" of "Owned card data" to be omitted. Moreover, the growth condition for each of the characters to grow (i.e. for its parameters to change) may include a condition such as, for example, a condition upon the number of times of playing, a condition upon the number of clears (for example, whether the musical piece M has been played to the end, whether a score of a predetermined value has been gained, and combinations of these may be used as a clearing condition, and a decision of clear may be reached if this clearing condition is satisfied), a condition upon the number of times its character card 39 is used, a condition upon the number of times its skill is activated, a condition upon the success of some predetermined task (such as clearing of a specific musical piece or the like), and so on. And, as one example, each character may grow according to such growth conditions. In a similar manner, the beneficial effect of growth may include, for example, raising the level of the character (as one example, part of the parameters) (along with enhancing various parameters such as the HPs and skill and so on), upgrading the skill level (the beneficial effects of the skill), changing the skill itself, changing of an attribute (if the parameter includes an item of an attribute), increasing the beneficial effect of an attribute, and so on. Furthermore, it would be acceptable to implement these changes by combining a plurality of the character cards 39 (including both when the subject character changes so as to grow and when it changes to some different character). Alternatively, it would also be possible to implement growth of various types according to items of various types. For example, it would be possible for an item to be used in order to acquire some specific skill, or in order to change a skill that is intrinsic to a character, or the like. In this case, since it would be possible to change the relationship between the skills and the characters, accordingly it would be possible to select the subject character to be used without any relationship to its intrinsic skill.

On the other hand, the sequence data 38 is data describing the operational timings at which pushing in operation and/or rotational operation of each of the rotation buttons B are to be performed. Accordingly, as one example, the sequence data 38 may be used in order to display object images 47 of various types that are to be disposed in appropriate positions along with the passage of time. In concrete terms, an object image 47 that corresponds to each of the operational timings in the sequence data 38 is displayed along each of the lane images 42, so that the operational timings may be guided as the positions of the judgment marker images 46 and the positions of the object images 47 come to agree with one another. Moreover, the sequence data 38 is also used for disposing objects in the virtual three dimensional space so as to correspond to this type of display. Furthermore, as one example, the sequence data 38 may be prepared for each musical piece (or further, for each degree of difficulty).

Figure 14:
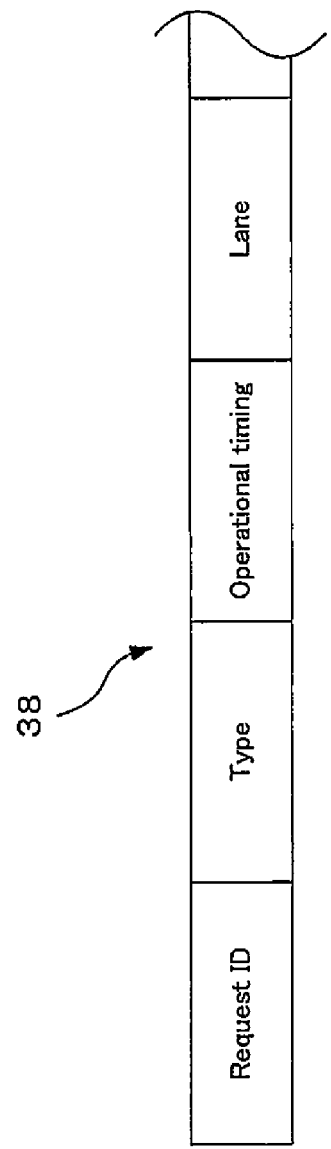
FIG. 14 is a figure showing an example of contents of sequence data.

FIG. 14 is a figure showing an example of the details of the sequence data 38. As shown in FIG. 14, as one example, the sequence data 38 may include the information items "Request ID", "Type", "Operational timing", and "Lane". And, as one example, the sequence data 38 may be structured as a set of recordings in which these items of information are described so as to be mutually associated.

The "Request ID" is information for identifying each operational timing. Accordingly, a unique ID for each operational timing (hereinafter this is sometimes termed the "Request ID") may be used as the information item "Request ID". And each of the operational timings (in other words, the object image 47 corresponding thereto) is specified by its request ID. The "Type" is information indicating the type of the object image 47. For example, information that indicates a first operation object image 47a or a second operation image 47b may be used as the information item "Type". In other words, the type of the object image 47 that is to correspond to the operational timing is specified by the information "Type".

The item "Operational timing" is information indicating the operational timing at which pushing in operation or rotational operation is to be performed. Information that specifies the elapsed timing during the musical piece from its start timing may, for example, be used as the information item "Operational timing". In concrete terms, for example, the information item "Operational timing" may be described with comma separated values that specify the bar number, the beat count, and the time point in the beat in the musical piece. And "Lane" is an information item that specifies the lane image 42 in which the object image 47 is to be disposed. For example, a number indicating one of the lane images 42 may be used as the information item "Lane". Moreover, as one example of such numbers, it would be acceptable for a number to be employed that corresponds to each lane image when the lane images 42 are allocated numbers in order from the left. In this case, the difference between the higher and lower positions may be taken into consideration in the number, or may not be taken into consideration.

Next, card determination processing, region presentation processing, sequence processing, and operation evaluation processing will be described. The card determination processing is processing for providing the character selection process (S2). To put it in another manner, the card determination processing is processing for awarding a selection opportunity for selecting a character card 39 to be used in play. And the region presentation processing is processing for presenting the game region 45. Moreover, the contents of the game region 45 change according to which one of the normal mode and the special mode is supplied, and the contents of the game screen (in the following either of these may sometimes be referred to as the "game screen 40", if no particular distinction is to be made between the normal game screen 40A and the special game screen 40B) changes according to the contents of the game region 45. Due to this, as one example, the region presentation processing is also used for distinguishing whether the normal game screen 40A is to be presented or whether the special game screen 40B is to be presented. On the other hand, the sequence processing is processing for disposing object images 47 of various types at appropriate positions upon the lane images 42 in the game region 45. As one example, the sequence processing may be executed as a portion of the region presentation processing. Moreover, the operation evaluation processing is processing for evaluating the actual operational timings of the users.

Figure 15:
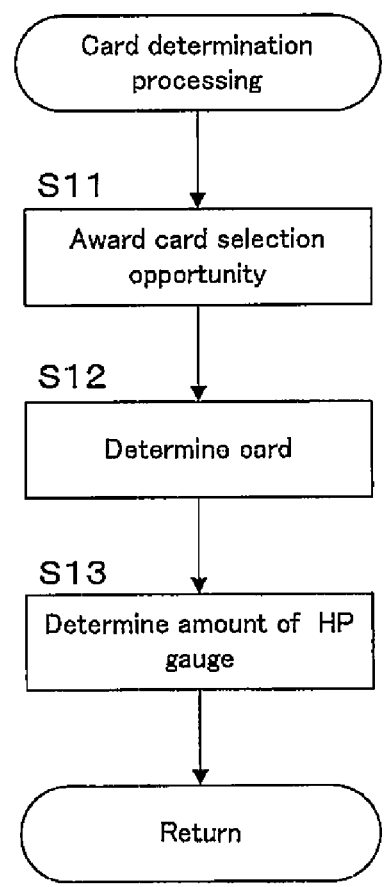
FIG. 15 is a figure showing an example of a flow chart of a card determination processing routine.
Figure 16:
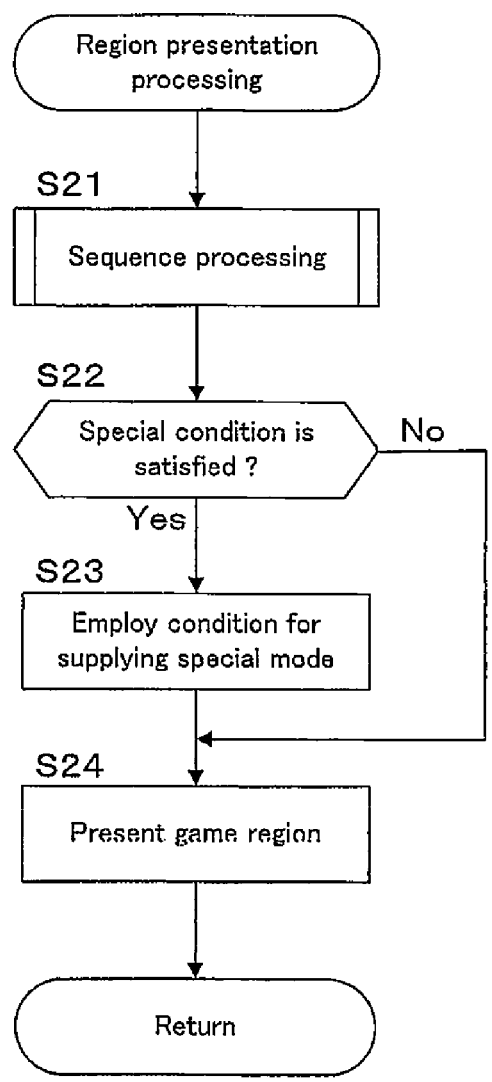
FIG. 16 is a figure showing an example of a flow chart of a region presentation processing routine.
Figure 17:
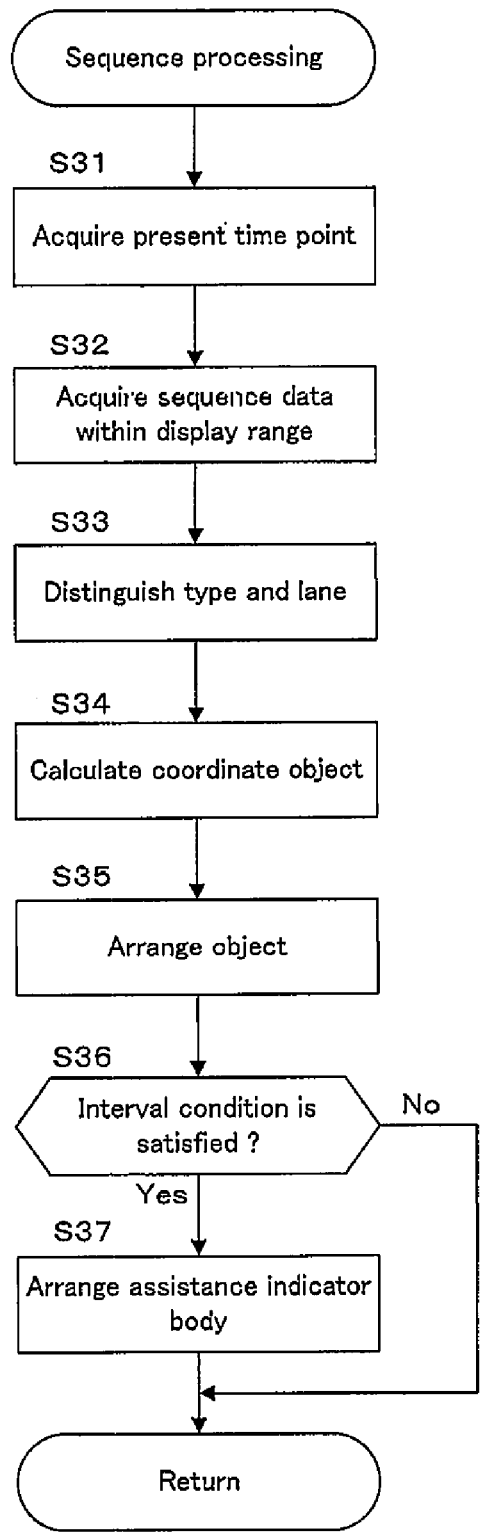
FIG. 17 is a figure showing an example of a flow chart of a sequence processing routine.
Figure 18:
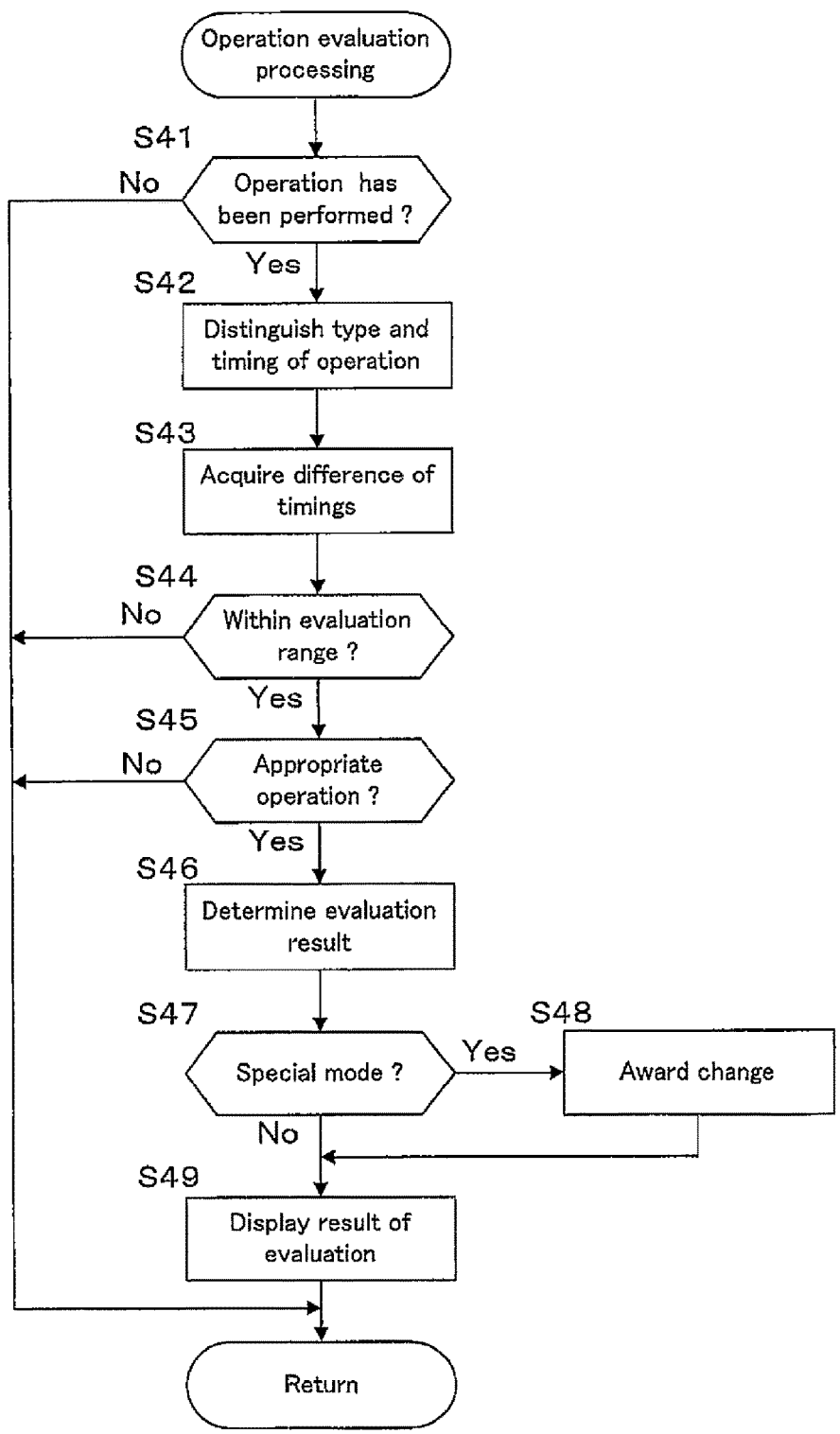
FIG. 18 is a figure showing an example of a flow chart of an operation evaluation processing routine.

For example, the card determination processing may be implemented by the control unit 30 of the game machine GM according to the routine of FIG. 15, and likewise the region presentation processing may be implemented according to the routine of FIG. 16, the sequence processing may be implemented according to the routine of FIG. 17, and the operation evaluation processing may be implemented according to the routine of FIG. 18. In concrete terms, the routines of FIGS. 15 through 18 are all executed by the control unit 30 via the game supply section 37. It should be understood that, apart from the above processing activities, the control unit 30 of the game machine GM and the control unit 10 of the central server 2 also perform per se known processing of various types and so on, either singly or in mutual cooperation. However, detailed explanation of this aspect is omitted.

FIG. 15 shows an example of a flow chart of a card determination processing routine for implementing the card determination processing. For example, each time that start operation for starting the music game (including collection of the predetermined price) is executed, the routine of FIG. 15 may be executed after this start operation. In more concrete terms, as one example, the routine of FIG. 15 may be executed after a musical piece selection process (S1) that is provided after the start of operation.

When the routine of FIG. 15 starts, first in a step S11 the game supply section 37 awards a card selection opportunity. One example of a card selection opportunity is an opportunity for selecting a character card 39 to be used in the music game. In concrete terms, for example, the game supply section 37 provides a card selection opportunity of the following type. For example, first, the game supply section 37 may acquire play data 14b from the central server 2 corresponding to the user ID of a card ID. Moreover, options (i.e. character cards 39) are presented as subjects for selection on the basis of this play data 14b that has been acquired. And an opportunity is provided for the operation of selection among those options by the user to be received. As a result, this opportunity functions as a card selection opportunity. This is one example of how the game supply section 37 may provide a card selection opportunity. It should be understood that, if the character cards 39 are physical cards, it would also be acceptable to arrange, as a card selection opportunity, for the game supply section 37 to award an opportunity (i.e. a time interval) simply for acquiring information that is recorded upon the character cards 39 (for example, information that may be recorded by a technique similar to that employed for the card CD, such as a code like a two dimensional code or the like, or a non-volatile storage medium or the like).

In the next step S12, on the basis of the selection result in the step S11, the game supply section 37 determines a character card 39 that is to be used in the music game, in other words to be used in the play process (S3). It should be understood that, if a plurality of characters are to be used in the music game, then the game supply section 37 provides a card selection opportunity (in the step S11) that permits a plurality of characters to be selected, and then in the step S12 determines a plurality of the character cards 39 as being character cards 39 that are to be used in the play process.

In the next step S13, on the basis of the result of the determination in the step S12, the game supply section 37 determines the remaining amount of HPs 52a to be initially set in the play process, so that this amount is reflected in the display of the HP gauge 52 on the game screen 40. And, when the processing of this step S13 is completed, the game supply section 37 terminates this iteration of the routine. The character selection process (S2) is supplied in this manner. Moreover, the initial display amount of HP 52a is determined.

FIG. 16 is a figure showing an example of a flow chart for a region presentation processing routine for implementing region presentation processing. The routine of FIG. 16 may, for example, be repeatedly executed on a predetermined cycle during the playing of the music game in the normal mode. When the routine of FIG. 16 starts, first in a step S21 the game supply section 37 performs sequence processing. The details of this sequence processing will be described hereinafter.

In the next step S22, the game supply section 37 determines whether or not the special condition is satisfied. For example, as described above, the special condition may be satisfied when the foot pedal 8 has been operated after the mode change value 50a has exceeded some predetermined amount. Accordingly, as one example, the game supply section 37 may determine whether or not this type of special condition is satisfied on the basis of the amount of the mode change value 50a and the output signal from the foot pedal 8. Furthermore, if the special condition is satisfied, then the special condition continues to be satisfied until subsequently a termination condition is satisfied. In other words, in this step S22, after the special condition has been satisfied, an affirmative result is continuously returned until the termination condition is satisfied. This type of determination may, for example, be managed with a special mode flag. For example, this special mode flag is a flag that is managed by being set to "1" after the special condition has been satisfied until the termination condition is satisfied, and by being set to "0" in other circumstances. As a result, as one example, in the step S22, the game supply section 37 may also determine whether or not the termination condition is satisfied. And if the result of this determination is negative, in other words if the special condition is not satisfied (i.e. if the special mode flag is "0"), then the game supply section 37 skips the step S23, and the flow of control proceeds to the step S24.

On the other hand, if the result of the determination in the step S22 is affirmative, in other words if the special condition is satisfied (i.e. when the special mode flag is "1"), then the game supply section 37 advances the flow of control to the step S23. In this step S23, the game supply section 37 employs a condition for supplying the special mode. For example, if the special mode is supplied by changing the photographic conditions, then the photographic conditions for the special mode are employed as the photographic conditions. In other words, the photographic conditions are changed from the photographic conditions for the normal mode to the photographic conditions for the special mode. For example, if photographic conditions are fixedly set for providing the special game screen 40B, then the photographic conditions are changed to the details of these settings (for example to the example of FIG. 9 or the like). Moreover, if the photographic conditions are set according to specific conditions, then the specific conditions for this operating episode are specified. For example, if a state of operation upon the rotation buttons B and/or upon the foot pedal 8 is to be employed as the specific conditions, then the specific conditions are specified according to the outputs from these devices. And the game supply section 37 changes the photographic conditions to details corresponding to the specific conditions that have thus been specified.

In the next step S24, the game supply section 37 creates a two dimensional image that corresponds to the result of photography if the virtual three dimensional space were to be photographed with a virtual camera under the photographic conditions for the normal mode or under the photographic conditions that have been changed in the step S23 (i.e. under the photographic conditions for the special mode), and presents this image as the game region 45. Furthermore, if the special mode is being provided, then a change that corresponds to the beneficial effect of the skill of the character card 39 is awarded in the game region 45. For example, if a character card 39 is used that has the skill of influencing the display of the game region 45 (for example, of influencing the width of the judgment marker images 46 or the like), then the game supply section 37 presents the game region 45 so as to reflect the beneficial effect of this skill. On the other hand, if the termination condition is satisfied, then the game supply section 37 again presents the game region 45 under the photographic conditions for the normal mode. And, when the processing of this step S24 has been completed, the game supply section 37 terminates this iteration of the routine.

A game screen 40 that includes the game region 45 that gives the effect of a virtual three dimensional space is displayed upon the monitor MO by the routine of FIG. 16. In more concrete terms, in the case of the normal mode, as the game screen 40, a normal game screen 40A is displayed upon which no influence has been exerted from the beneficial effects of skill. On the other hand, in the case of the special mode, as the game screen 40 that gives the effect of a virtual three dimensional space, a special game screen 40B is displayed that reflects the beneficial effects of skill. In concrete terms, if a character card 39 is being used that has a skill that influences the display of the game region 45, then the beneficial effect of this skill is reflected in the special game screen 40B. Moreover, the special game screen 40B is presented as a two dimensional image corresponding to photographic conditions that are different from the photographic conditions in the normal mode. And changeover is performed between these game screens 40 according to the special condition and the termination condition.

FIG. 17 is a figure showing an example of a flow chart of a sequence processing routine for implementing the sequence processing. As one example, the routine of FIG. 17 may be executed by being called in the step S21 of the routine of FIG. 16. When the routine of FIG. 17 starts, first, in a step S31, the game supply section 37 acquires the present time point in the musical piece.

In the next step S32, the game supply section 37 acquires the sequence data 38 within the display range. This acquisition is executed so as to include records having operational timings over the time interval length (i.e. the display range) that are to be displayed in the game region 45. For example, the display range may be set to a time interval length from the present time instant that is equivalent to four bars of the musical piece. Moreover, the display range may also be set according to the photographic conditions, such as for example the position of photography, the angle of photography or the angle of view, and so on. For example since the higher the photographic position of the virtual camera is set, the longer is the lane image to be displayed, accordingly it would be acceptable to set the display range in this case to a longer range (for example to six bars or the like). The angle of photography and the angle of view may also exert influences upon the display range in a similar manner.

In the next step S33, the game supply section 37 distinguishes the types of objects in the virtual three dimensional space that correspond to the operational timings and the lanes in which (i.e., in which of the five lanes) these objects should be disposed. This distinction also functions to distinguish the types of the object images 47 corresponding to the operational timings and the lane images 42 in which these object images 47 should be disposed (i.e., to determine in which of the five lane images 42 they should be disposed). Moreover, this distinction is executed on the basis of the information relating to type and lane corresponding to the operational timings in the sequence data 38.

In the next step S34, on the basis of the results of acquisition in the steps S31 through S33 and so on, the game supply section 37 calculates the coordinates of all the objects included in the display range in the virtual three dimensional space. This calculation may, for example, be performed in the following manner. In concrete terms, the positions corresponding to each of the operational timings on each of the lanes (using the results of determination in the step S33) are calculated as distances from the judgment markers (at the present time instant), so that the judgment markers correspond to the present time instant and each lane corresponds to the time axis. In other words, the position on the lane from judgment marker of that lane in the time axis direction (in other words, in the direction of shifting of the judgment marker) is calculated, according to the time interval difference between each of the operational timings and the present time instant. And the positions calculated in this manner on each of the lanes are calculated as being the coordinates of each of the objects. As one example, the calculation of the coordinates may be performed in this manner. Moreover, this calculation also functions for calculation of the coordinates of the object images 47 in the game region 45.

In the next step S35, the game supply section 37 arranges the objects of various types at the coordinates that have been calculated in the step S34 (using the results of the distinction in the step S33). Next, in the step S36, the game supply section 37 determines whether or not an interval condition is satisfied. As one example, as described above, the interval condition may be satisfied by execution timings that are the same and that correspond to different lane images 42. Accordingly, for example, the game supply section 37 may determine whether or not there exist objects in the display range that correspond to the same operational timing and that are positioned in different lanes. If the result of this determination is negative, in other words if objects of this type are not present, then the game supply section 37 decides that the interval condition is not satisfied. On the other hand, if the result of this determination is affirmative, in other words if objects of this type are present, then the game supply section 37 decides that the interval condition is satisfied. And if the result of the determination in the step S36 is negative, in other words if the interval condition is not satisfied, then the game supply section 37 skips the step S37 and terminates this iteration of the routine. In this case, the game supply section 37 returns to the routine of FIG. 16 and executes the processing of the step S22 and subsequent steps.

On the other hand, if the result of the determination in the step S36 is affirmative, in other words if the interval condition is satisfied, then the game supply section 37 advances the flow of control to the step S37. In the step S37, the game supply section 37 arranges an assistance indicator body to correspond to an assistance indicator in the virtual three dimensional space. In concrete terms, the game supply section 37 disposes an assistance indicator body (in the game region 45 this is displayed as an assistance line 48) that connects between objects in the three dimensional space, so that the assistance line 48 is displayed connecting between the object images 47 that satisfy the interval condition. When the processing of the step S37 is completed, the game supply section 37 terminates this iteration of the routine. And the game supply section 37 returns to the routine of FIG. 16 and executes the processing of the step S22 and subsequent steps.

Returning to the routine of FIG. 17, objects of various types are disposed at appropriate positions in the lanes of the virtual three dimensional space. Moreover, each of the judgment markers shifts so as to pass through each of the objects at each operational timing. And, due to the routine of FIG. 16, the game region 45 that corresponds to this virtual three dimensional space is displayed upon the game screen 40. In other words, due to the routines of FIG. 16 and FIG. 17, the object images 47 in the game region 45 are disposed at appropriate positions on the lane images 42. Moreover, the judgment marker images 46 are shifted so as to pass through the object images 47 at the operational timings. In other words, the positions of the judgment marker images 46 and the positions of the object images 47 are controlled along with the passage of time, so that the user is guided as to the operational timings by the positions of the judgment marker images 46 and the positions of the object images 47 agreeing with one another.

On the other hand, FIG. 18 is a figure showing an example of a flow chart for an operation evaluation processing routine for implementing the operation evaluation processing. As one example, the routine of FIG. 18 may be repeatedly executed on a predetermined cycle during the play process.

When the routine of FIG. 18 starts, first in a step S41 the game supply section 37 determines whether or not operation upon the rotation buttons B has been performed, on the basis of the output results from the control panel 7, and in more concrete terms on the basis of the output results from the rotation buttons B. If the result of this determination is negative, in other words if no operation has been performed upon any of the rotation buttons B, then the game supply section 37 skips the subsequent processing and terminates this iteration of the routine.

On the other hand, if the result of the determination in the step S41 is affirmative, in other words if some operation has been executed upon the rotation buttons B, then the game supply section 37 transfers the flow of control to a step S42. In this step S42, the game supply section 37 distinguishes the type and the timing of the operation on the basis of the output results from the rotation buttons B. For example, the types of operation that are distinguished may include pushing in operation, rotational operation, repeated operation, continuous operation, combination operation, and so on. Furthermore, apart from the above, for example, the types of operation that are distinguished also may include determining upon which of the rotation buttons B (i.e. upon which of the five rotation buttons B) that operation has been performed.

In the next step S43, on the basis of the determination in the step S42, the game supply section 37 acquires the difference between the actual operational timing of the operation of some type and the operational timing at which that operation of some type should have been executed. For example, the operational timing at which the operation of some type was to be executed may be described in the sequence data 38. In concrete terms, as one example, the game supply section 37 may specify the operational timing in the sequence data 38 that is closest to the actual operational timing as being the operational timing at which the operation of some type was to be executed. And, as one example, in the step S43, the game supply section 37 may acquire the time interval difference between this specified operational timing and the actual operational timing.

In the next step S44, the game supply section 37 determines whether the difference in timing acquired in the step S43, in other words the time interval difference, is within an evaluation range or not. As the timing evaluation range, for example, by taking the operational timing at which this operation should have been executed as a reference, a timing spanning a predetermined range before and after that timing may be employed. In other words, as one example, a timing spanning a predetermined range and including the subject operational timing at its center may be employed as the timing evaluation range. And if the result of the determination in the step S44 is negative, in other words if, as one example, the time interval difference is not included in the evaluation range, then the game supply section 37 skips the subsequent processing and terminates this iteration of the routine.

In the next step S45, on the basis of the information about the types of operation acquired in the step S42, the game supply section 37 determines whether the actual operation that has been executed upon the rotation buttons B was an appropriate operation or not. In concrete terms, for example, first, the game supply section 37 determines whether or not the rotation button B upon which the actual operation was executed is the rotation button corresponding to the operation timing that is specified as being the operational timing at which the operation of some type in the step S43 should have been executed. For example, the information "Lane" in the sequence data 38 may be employed for this determination. In concrete terms, as described above information for specifying one of the five lane images 42 may be employed as the information "Lane". Furthermore, as described above, the five lane images 42 respectively correspond to the five rotation buttons B. Due to this, this determination may reach an affirmative result if the rotation button B upon which the actual operation was executed agrees with the rotation button B corresponding to the lane image 42 specified by the information "Lane" in the specified operational timing, and may reach a negative result if that is not the case. And, in the case of a negative result, the game supply section 37 determines in the step S45 that the operation was not appropriate operation. Moreover, in the case of an affirmative result, the game supply section 37 determines whether or not the type of the actual operation corresponds to the type of the operation that was required. This determination may, for example, employ the information "Type" in the sequence data 38. In concrete terms, it is determined whether or not the type of the actual operation corresponds to the type of operation corresponding, via the information "Type" in the sequence data 38, to the specified operational timing. If the result of this determination is negative, then the game supply section 37 determines that the operation in the step S45 was, after all, not appropriate operation. And the game supply section 37 skips the subsequent processing, and terminates this iteration of the routine.

On the other hand, if the type of the actual operation corresponds to the type of operation corresponding, via the information "Type" in the sequence data 38, to the specified operational timing (i.e. in the case of an affirmative result), then the game supply section 37 determines in the step S45 that the operation was appropriate. And then the game supply section 37 advances the flow of control to a step S46. In this step S46, the game supply section 37 determines an evaluation result on the basis of the time interval difference that was acquired in the step S43. This evaluation result is evaluated to be higher, the smaller is the time interval difference. Moreover, a determination of the amount of the mode change value 50a and/or of the HPs 52a, both of which increase and decrease on the basis of appropriate operation or mistaken operation, is included in this evaluation result.

In the next step S47, the game supply section 37 determines whether or not the mode that is currently being supplied is the special mode. If the result of this determination is negative, in other words if the current mode is not the special mode, then the game supply section 37 transfers the flow of control to the step S49. On the other hand, if the result of this determination is affirmative, then the game supply section 37 advances the flow of control to the step S48.

In the next step S48, the game supply section 37 awards a change according to skill upon the special game screen

40B. In concrete terms, for example, the game supply section 37 may award a change according to the beneficial effects of skill in the result of evaluation determined in the step S46.

In the next step S49, the game supply section 37 displays, upon the game screen 40, the result of evaluation determined in the step S46, or the result of evaluation after awarding a change in the step S48. And, when the processing of this step S49 is completed, the game supply section 37 terminates this iteration of the routine. Due to this, the actual operational results of each user are evaluated on the basis of the contents of the sequence data 38. Furthermore, in the case of the special mode, a beneficial effect corresponding to the skill is awarded as a result of the evaluation.

As has been explained above, according to this embodiment, a plurality of character cards 39 (i.e. of characters) having characteristics of various types are prepared, and the character card or cards 39 that have been selected from among those are used in playing the music game. Furthermore, in the special mode, beneficial effects corresponding to the skills of this character card or cards 39 are awarded in the music game. In other words, in the music game, beneficial effects (changes) are awarded in the special mode according to the results of selection by the user U. Due to this, even supposing that the musical piece M that is being used in play is the same, if nevertheless there is a difference in the results of selection of the character cards 39, then this can make a difference in the details of the special mode, in other words a difference in the details of the music game. Due to this, it is possible for the extent of influence that is exerted upon the result of the music game to be enlarged, not only by the selection of musical piece M and by the level of experience of each user U, but also even by the range that includes his selection of character cards 39. Moreover, since there are differences between the skills corresponding to the characters, accordingly it is possible to add collection of character cards 39 and so on (including training up, if training up of the characters is possible) as a game factor in the music game.

Furthermore, a tendency is set for each musical piece M corresponding to the musical characteristics such as its genre and so on. On the other hand, the skill of each of the character cards 39 corresponds to this tendency. Due to this, it is possible to establish various types of compatibility between the musical pieces M and the character cards 39. And, due to this, it is possible to change the value of the musical pieces M that are used for playing the musical game via selection of the character cards 39 (or, conversely, it is possible to change the values of the character cards 39 via selection of the musical pieces M). Furthermore, various types of operation such as rotational operation and so on are required in the music game, and the tendencies corresponding to musical characteristics also include tendencies corresponding to operations of various types, such as "Type of operation" and so on. And the characteristics of each of the character cards 39 also correspond to operations of various types whose correlation with this type of game result is high. As a result, it is possible to establish compatibility of the skills of the character cards 39 with tendencies for which the possibility of influencing the result of the game is high.

On the other hand, the influence of the skills of the character cards 39 is limited to the special mode. In other words, the beneficial effect of the skill of each of the character cards 39 is not manifested in the normal mode. As a result, in the music game, it is possible to provide situations in which the beneficial effects of skills are reflected and also situations in which they are not reflected. Moreover, the special mode is supplied via the special game screen 40B that corresponds to photographic conditions that are different from those in the normal mode. Due to the above, it is possible to add a level of interest to the music game that cannot be imparted only in the normal mode. And it is possible to change over between the normal mode and the special mode on the basis of the special condition and the termination condition. Due to this, it is possible to add the timing at which the skill of each character card exerts its influence as one factor in the game.

Furthermore, both the special condition and the termination condition are satisfied by the user U performing the operation of stepping upon the foot pedal 8. Due to this, it is possible for the user U to select the start timing and the end timing of the special mode, in other words to select the interval over which the influence of the skill of each of the character cards 39 will be exerted. And, due to this, it is possible further to add the timings of skill usage as a game factor.

On the other hand, the special condition for starting the special mode includes a quantity condition in its requisites. In other words, the special mode is not supplied if the mode change value 50a does not exceed some predetermined amount. And the state of play of the music game is reflected in the value of the mode change value 50a. Due to this, it is possible for the state of play of the music game to be reflected in the changing over of the modes. Accordingly, it is possible for the level of experience of the music game by the user U to reflect the beneficial effects of skills that correspond to the results of selection by the user U. As a result, it is also possible to anticipate a balance between the influences of them both. Due to the above, along with it being possible to suppress boredom of the user, it is also possible to enhance the level of interest of the music game.

In the embodiment described above, the control unit 30 of the game machine GM functions as the "opportunity awarding device" of the Claims by executing the routine of FIG. 15 via the game supply section 37. In a similar manner, the control unit 30 of the game machine GM functions as the "evaluation device" of the Claims by executing the routine of FIG. 18 via the game supply section 37. Furthermore, the control unit 30 of the game machine GM functions as the "characteristic awarding device" of the Claims by, for example, executing the routine of FIG. 18 via the game supply section 37. On the other hand, the storage unit 31 of the game machine GM functions as the data storage device of the Claims by storing the sequence data 38.

The present invention is not to be considered as being limited by the embodiment described above; it could be implemented in various appropriate ways. For example, in the embodiment described above, in the music game, operations of a plurality of types, such as pushing in operation and rotational operation and so on, are requested as play actions. However, the music game of the present invention is not limited to this type of embodiment. For example, in the music game, it would be acceptable for only one type of play action to be required, for example only pushing in operation or the like. And it would also be acceptable for each skill to correspond to one of these types of play action.

Furthermore, in the embodiment described above, among the tendencies that correspond to the musical characteristics of the musical pieces M, the skill of each of the character cards 39 (i.e. of each character) is correlated with the tendency "Type of operation". However, the present invention should not be considered as being limited to this kind of embodiment. For example, it would be acceptable for a skill whose beneficial effect is manifested when an object image 47 is has been displayed upon a specified lane image 42 or a skill whose beneficial effect is manifested along with display of a first operation object image 47a or the like to be correlated with various types of tendency such as "How displayed" or the like. In a similar manner, the beneficial effect of each of the character cards 39 in terms of skill is not limited to being only one effect. For example, it would be acceptable for a plurality of beneficial effects to be conferred by the skill of each of the character cards 39. Or, it would also be possible for a plurality of skills to be exerted by each of the character cards 39. Moreover, if each of the characters can have a plurality of skills, it would also be acceptable for each of the skills to be used differently. For example, it would be possible for each of the skills to be constituted so that some of the skills continue to manifest their beneficial effects without any relationship with operation from the start of the musical piece or the like (hereinafter, sometimes these are termed "passive type skills"), while others of the skills manifest their beneficial effects due to operation of the foot pedal 8 (i.e. predetermined operation) (hereinafter, sometimes these are termed "active type skills"). It will be acceptable to arrange for active type skills to function as skills that manifest their beneficial effects only in the special mode as described above; or, alternatively, it will be acceptable to arrange for them to manifest their beneficial effects without any relationship with the special mode. Moreover, it would be acceptable to arrange for the active type skills to manifest their beneficial effects simultaneously with the passive type skills; or, alternatively, it would also be acceptable for them to be used by being changed over with the passive type skills. For example, if a single character is able to possess a plurality of active type skills, then it would be possible to arrange for those skills to be activated simultaneously by predetermined operation; or, alternatively, it would also be possible to arrange for them to be activated in a predetermined order. Or, alternatively, it would also be acceptable to arrange for them to be activated at random. In a similar manner, it would be acceptable for passive type skills and active type skills to correspond to the classifications of skills, such as the classification "HP recovery" corresponding to a passive type skill, and the classification "Damage increase/decrease" corresponding to an active type skill.

Furthermore, in the embodiment described above, the skill of each the character cards 39 (i.e. of each character) corresponds to a tendency according to musical characteristics. However, the present invention is not to be considered as being limited to this embodiment. For example, it would also be acceptable for the skill of each of the character cards 39 (i.e. of each character) not to correspond with this sort of tendency. In other words, it would be acceptable for the skill of each of the character cards 39 (i.e. of each character) to exert change upon the music game, without any relationship to the tendencies of the musical characteristics of the musical pieces M. In a similar manner, it would also be acceptable for no tendency corresponding to musical characteristics to exist for the musical pieces M.

In the embodiment described above, the skill of each of the character cards 39 manifests its beneficial effects in the special mode. However, the present invention is not to be considered as being limited by this feature. For example, it would also be acceptable to arrange for the skills to manifest their beneficial effects in the normal mode. Accordingly, it would also be acceptable to omit the special mode. In this case, for example, it would be acceptable for the special condition to be satisfied along with the selection of the character cards 39. Accordingly, it would also be acceptable to omit the termination condition (i.e. it would be acceptable for the beneficial effects always to be manifested during play). Or, apart from the feature described above, for example, it would also be acceptable for the termination condition to be satisfied when a fixed predetermined time period (a time period that is not related to the state of play) has elapsed. In this manner, it would be acceptable to employ conditions of various types as the termination condition.

In the embodiment described above, the judgment marker images 46 and the judgment markers are shifted along the lane images 42, and so on. In other words, due to the shifting of the judgment marker images 46 and the like, relative displacement with the object images 47 and so on is generated. And the operational timings are guided by this type of relative displacement. However, the relative displacement is not limited to this format. For example, in a manner opposite to the embodiment described above, it would also be acceptable to arrange to shift the object images 47 and the objects along each lane image 42, or the like. In other words, it would be acceptable to generate relative displacement by shifting the object images 47 or the like. Provided that relative displacement is generated between the object images 47 or the like and the judgment marker images 46, various different methods for providing the relative displacement of the present invention may be employed, such as, for example, shifting both of them (for example, including the cases in which either one of the object images 47 and the judgment marker images 46 functions as both a command mark and a reference mark) or the like. Furthermore, the manner in which the operational timings are guided is also not limited to being via this type of relative displacement. For example, in a case in which, as the operation units, a plurality of operation units are employed that can display images of various types, it would also be acceptable for the operational timings of the operation units to be guided via magnification or shrinkage of the images displayed on the various operation units, or the like. The guidance of the operational timings is also not to be considered as being limited to being of this form via images of this type. For example, it would also be acceptable for the operational timings to be guided via audio.

In the embodiment described above, as the special mode, the same music game was provided under different photographic conditions and so on. However, the game in the special mode is not to be considered as being limited to this type of format. For example, as the special mode, it would also be acceptable to provide a game of any of various types that are different from a music game, such as an action game, a role playing game, an adventure game, a simulation game, a puzzle game, a card game, a shooting game, a sports game, a compound game, or the like.

Moreover, in the embodiment described above, it was supposed that, as the characters corresponding to the character cards 39, characters having individual or personal factors such as monsters or people appearing in the music game were employed. However, the possibilities for the characters are not to be considered as being limited to the above types. For example, the possibilities for the characters may also include various other options, such as other things (not having elements of personality) or items or the like that are included in the music game (or in games of various other types).

Furthermore, the game machine GM is not limited to being a game machine for business use. a machine of any appropriate type, such as, for example, a stationary game machine for use in a household (including a stationary personal computer that is capable of executing a game), a portable type game machine (including a smart phone that is capable of executing a game, a tablet PC, or a portable terminal such as a portable computer and so on), or the like may be employed as the game machine GM. Moreover, in the embodiment described above, the control unit 30 and the storage unit 31 were provided to the game machine GM. However, the game machine of the present invention is not to be considered as being limited to this type of format. For example, it will be acceptable for the control unit 30 and the storage unit 31 to be provided over the network by utilizing cloud computing. In other words, it will be acceptable for the game machine GM to be structured as a terminal that displays and provides the results of processing by the control unit 30 via the network 3. Moreover, it will also be acceptable for the central server 2 to be omitted, and for the game system of the present invention to be implemented via a single game machine.

An example of the present invention that is derived from the details described above is described in the following. It should be understood that, although reference symbols that refer to the attached drawings have been inserted in parentheses in the following explanation in order to make the present invention easier to understand, the present invention is not for this reason to be considered as being limited by the modes shown in the figures.

The game system of the present invention is a game system (1) comprising a play input apparatus (7) that is used for input of play actions, providing a music game in which guidance is provided for execution timings at which the play actions should be executed, matched to the rhythm of a musical piece (M) that has been selected from a musical piece group (MF), and wherein the game system comprises: an opportunity awarding device (30) configured to award a selection opportunity (S2) for selecting a character to be used during play from among a plurality of characters (39) that are prepared so as to have a plurality of characteristics respectively corresponding to changes that are mutually different; and a characteristic awarding device (30) configured to, when a start condition is satisfied, award a change in the music game corresponding to the characteristic of a character that has been selected in the selection opportunity.

According to the present invention, a plurality of characters having a plurality of characteristics are prepared, and a character selected from among them is used in playing the music game. Furthermore, when the start condition is satisfied, change is awarded in the game according to the characteristics of that character. In other words, change is awarded in the music game according to the result of selection by the user. Due to this, even if the musical piece that is being used in play is the same, if there is a difference in the result of character selection, then it is possible to make a difference in the details of the music game. Due to this, it is possible to enlarge the extent to which influence is exerted upon the result of the music game, within a range that includes not only the selection of a musical piece and the level of experience, but also the selection of one or more characters. As a result, it is possible to prevent the user from getting bored. Moreover, it is also possible to enhance the level of interest of the game.

In one aspect of the game system of the present invention, the musical piece group may include a plurality of musical pieces (MG) that have mutually different musical characteristics; in the music game, the execution timings may be guided matched to the rhythm of each musical piece, so as to have tendencies corresponding to the musical characteristics; and the characteristics may correspond to the tendencies. In this case, there are tendencies that correspond to the characteristics in each musical piece, and the characteristic of each character is correlated with those tendencies. Due to this, it is possible to establish a level of compatibility between each musical piece and each character. And, due to this, it is possible to change the merit of the musical piece that is being used in playing the music game according to the selection of character. Or, conversely, it is possible to change the merit of a character according to the selection of musical piece.

In another aspect of the game system of the present invention: in the music game, play actions of a plurality of types and the execution timings of the play actions may be guided, so that the details are different according to the various musical pieces; the tendencies may include action tendencies corresponding to the play actions of a plurality of types; and the characteristics may correspond to the action tendencies. In this case, play actions of a plurality of types are requested, and the tendencies according to the musical characteristics include action tendencies corresponding to play actions of various types. And the characteristics of each character correspond to those action tendencies. On the other hand, since the play actions directly influence the result of the music game, accordingly the possibility is high that there is a correlation with the result of the music game. According to this aspect of the present invention, it is possible to establish compatibility with action tendencies of these types for which the possibility is high of exerting influence upon the results of the music game.

Various types of characteristic may be used as the musical characteristics. For example, in another aspect of the game system of the present invention, at least one of genre, source, and degree of difficulty of the musical pieces may be used as one of the musical characteristics.

In another aspect of the game system of the present invention, the music game may include a special mode in which the change is awarded and a normal mode in which the change is not awarded; and when the start condition is satisfied, the characteristic awarding device may award the change in the music game by providing the special mode, while, when a termination condition is satisfied in the special mode, the characteristic awarding device may terminate the special mode so as to provide the normal mode. In this case, the mode of the music game can be changed over between the normal mode and the special mode on the basis of the start condition and the termination condition. Due to this, it is possible to provide the music game in a state in which changes are awarded and in a state in which changes are not awarded. As a result, it is possible to add the start timings for the characteristics of the characters as one game factor. Due to this, along with it being possible further to suppress boredom of the user, also it is possible further to enhance the level of interest of the game.

The play actions may be evaluated appropriately. For example, in another aspect of the game system of the present invention, there may be further included a data storage device (31) configured to store sequence data (38) in which the execution timings are described in advance; and an evaluation device (30) configured to evaluate the actual timings of execution of the play actions, by taking the execution timings described in the sequence data as reference. Moreover, in this aspect, the music game may include a judgment value (50*a*) whose value changes according to the results of evaluation by the evaluation device; and the start condition may include a requirement for a quantity condition that is satisfied when the judgment value exceeds a predetermined amount, and that may be satisfied at least when the quantity condition is satisfied. In this case, it is possible to reflect the state of play of the music game in the changing over between modes. Due to this, it is possible to reflect the level of experience of the user in changes that correspond to the results of selection by the user. As a result, it is possible to anticipate a balance between the two of them.

In another aspect in which the music game includes a judgment value, there may further be included a changing input apparatus (8) configured to comprise a changing operation unit (8a) corresponding to the change; and wherein the start condition may further include, as a requisite, an operational condition that is satisfied when the changing operation unit is operated, and that may be satisfied when both the quantity condition and the operational condition are satisfied. Furthermore, in this aspect, the changing input apparatus may be adapted so that the changing operation unit is operated by foot. In the above cases, the mode is changed over according to operation by the user. Due to this, it is possible to allow the user, along with selecting a character, also to select the starting timing for change. Moreover, by the changing operation unit being operated by foot, it is possible to perform changing over of the mode without any hindrance to the play action of the user.

Furthermore, in the aspect in which the mode is changed over by operation of the changing operation unit, during the provision of the special mode, the value of the judgment value may decrease along with the passage of time; and the termination condition may be satisfied either when the value of the judgment value has all been consumed, or when a termination operation that indicates termination of the special mode has been performed upon the changing operation unit, or both. In this case, it is possible further to add the ending timing at which the characteristic influence of the character is ended as yet another game factor.

Various types of method may be adopted for the changes corresponding to the characteristics. For example, in an aspect in which the execution timings of the present invention are evaluated on the basis of the sequence data, the changes may include change that exerts an influence upon the result of evaluation by the evaluation device. Furthermore, for example, in a similar aspect, a play value (52a) may be prepared in the music game for determining whether or not play can continue; the value of the play value may change according to the result of evaluation by the evaluation device; and the value of the play value may be set separately for each character, so that the result of selection in the selection opportunity exerts an influence upon the time period of playing the music game. And, in this aspect, the changes may include change that exerts an influence upon change of the value of the play value corresponding to the result of evaluation by the evaluation device.

The timing of execution of the play actions may be guided in various different ways. For example, in one aspect of the game system of the present invention, there may be further included a display apparatus (MO) configured to display a game screen (40) that includes command marks (47) corresponding to the execution timings and a reference mark (46) corresponding to the present time instant; and wherein the music game may provide guidance for the execution timings via the game screen by generating relative displacements along a path between the command marks and the reference mark according to the passage of time, so as to bring the positions of the command marks and the position of the reference mark to agree with one another at the execution timings.

Furthermore, various types of operations, such as a motion and so on may be employed as the play actions. For example, in another aspect of the game system of the present invention, the play input apparatus may comprise an operation unit for playing that is used for inputting the play actions; and operations upon the operation unit for playing (B) may be employed as the play actions.

On the other hand, a non-transitory computer readable storage medium of the present invention stores a computer program which is adapted to cause a computer (30) comprising the play input apparatus described above to function as the devices of the game system described above. Thus, it is possible to implement the game system of the present invention by the computer program of the non-transitory computer readable storage medium of the present invention being executed.

What is claimed is:

1. A game system which comprises a computer having a play input apparatus that is used for input of play actions, and an output device for providing a game, wherein the computer, by executing a computer program, provides a music game, through the output device as the game, in which guidance is provided for execution timings at which the play actions should be executed, matched to the rhythm of a musical piece that has been selected from a musical piece group, and wherein the computer by executing the computer program functions as:

an opportunity awarding device configured to award a selection opportunity for selecting a character to be used during play from among a plurality of characters that are prepared so as to have a plurality of characteristics respectively corresponding to changes that are mutually different, through the output device by outputting signals; and a characteristic awarding device configured to, when a start condition is satisfied, award during the play of the music game differing from the selection opportunity, a change corresponding to the characteristic of a character that has been selected in the selection opportunity, through the output device by outputting signals, and wherein the play of the music game includes a special mode played in a condition in which the change is awarded and a normal mode played in a condition in which the change is not awarded; and when the start condition is satisfied in the normal mode which is in progress, the characteristic awarding device awards the change in the music game by providing the special mode, while, when a termination condition is satisfied in the special mode, the characteristic awarding device terminates the special mode so as to provide the normal mode.

2. A game system according to claim 1, wherein:

the musical piece group includes a plurality of musical pieces that have mutually different musical characteristics;

in the music game, the execution timings are guided matched to the rhythm of each musical piece, so as to have tendencies corresponding to the musical characteristics; and the characteristics correspond to the tendencies.

3. A game system according to claim 2, wherein:

in the music game, play actions of a plurality of types and the execution timings of the play actions are guided, so that the details are different according to the various musical pieces;

the tendencies include action tendencies corresponding to the play actions of a plurality of types; and the characteristics correspond to the action tendencies.

4. A game system according to claim 2, wherein at least one of genre, source, and degree of difficulty of the musical pieces is used as one of the musical characteristics.

5. A game system according to claim 1, further comprising:

a data storage device configured to store sequence data in which the execution timings are described in advance; and an evaluation device configured to evaluate the actual timings of execution of the play actions, by taking the execution timings described in the sequence data as reference.

6. A game system according to claim 5, wherein:

the music game includes a judgment value whose value changes according to the results of evaluation by the evaluation device; and the start condition includes a requirement for a quantity condition that is satisfied when the judgment value exceeds a predetermined amount, and is satisfied at least when the quantity condition is satisfied.

7. A game system according to claim 6, further comprising a changing input apparatus configured to comprise a changing operation unit corresponding to the change; and wherein the start condition further includes, as a requisite, an operational condition that is satisfied when the changing operation unit is operated, and is satisfied when both the quantity condition and the operational condition are satisfied.

8. A game system according to claim 7, wherein the changing input apparatus is adapted so that the changing operation unit is operated by foot.

9. A game system according to claim 7, wherein:

during the provision of the special mode, the value of the judgment value decreases along with the passage of time; and the termination condition is satisfied either when the value of the judgment value has all been consumed, or when a termination operation that indicates termination of the special mode has been performed upon the changing operation unit, or both.

10. A game system according to claim 5, wherein the changes include change that exerts an influence upon the result of evaluation by the evaluation device.

11. A game system according to claim 5, wherein:

a play value is prepared in the music game for determining whether or not play can continue;

the value of the play value changes according to the result of evaluation by the evaluation device; and the value of the play value is set separately for each character, so that the result of selection in the selection opportunity exerts an influence upon the time period of playing the music game.

12. A game system according to claim 11, wherein the changes include change that exerts an influence upon change of the value of the play value corresponding to the result of evaluation by the evaluation device.

13. A game system according to claim 1, further comprising a display apparatus configured to display a game screen that includes command marks corresponding to the execution timings and a reference mark corresponding to the present time instant; and wherein the music game provides guidance for the execution timings via the game screen by generating relative displacements along a path between the command marks and the reference mark according to the passage of time, so as to bring the positions of the command marks and the position of the reference mark to agree with one another at the execution timings.

14. A game system according to claim 1, wherein:

the play input apparatus comprises an operation unit for playing that is used for inputting the play actions; and operations upon the operation unit for playing are employed as the play actions.

15. A non-transitory computer readable storage medium storing a computer program that is adapted to cause a computer comprising the play input apparatus to function as the devices of the game system of claim 1.

* * * * *